United States Patent
Pasek et al.

(10) Patent No.: US 10,268,010 B2
(45) Date of Patent: Apr. 23, 2019

(54) CLAMPING AND ATTACHMENT DEVICE FOR CABLE ELEMENT

(71) Applicants: CommScope Connectivity Belgium BVBA, Kessel-Lo (BE); ADC CZECH REPUBLIC S.R.O., Brno (CZ)

(72) Inventors: Jiri Pasek, Brno (CZ); Jiri Ambroz, Brno (CZ); Eric Schurmans, Geetbets (BE)

(73) Assignees: CommScope Connectivity Belgium BVBA, Kessel-Lo (BE); ADC Czech Republic, S.R.O., Brno (CZ)

( * ) Notice: Subject to any disclaimer, the term of this patent is extended or adjusted under 35 U.S.C. 154(b) by 0 days.

(21) Appl. No.: 14/904,644

(22) PCT Filed: Jul. 3, 2014

(86) PCT No.: PCT/EP2014/064168
§ 371 (c)(1),
(2) Date: Jan. 12, 2016

(87) PCT Pub. No.: WO2015/003989
PCT Pub. Date: Jan. 15, 2015

(65) Prior Publication Data
US 2016/0170164 A1 Jun. 16, 2016

Related U.S. Application Data

(60) Provisional application No. 61/845,759, filed on Jul. 12, 2013.

(51) Int. Cl.
*G02B 6/44* (2006.01)
*G02B 6/46* (2006.01)
(Continued)

(52) U.S. Cl.
CPC ......... *G02B 6/4444* (2013.01); *G02B 6/4471* (2013.01); *G02B 6/4478* (2013.01);
(Continued)

(58) Field of Classification Search
CPC ...... G02B 6/4444; G02B 6/4478; G02B 6/46; G02B 6/4471; G02B 6/4446; H02G 3/083; H02G 15/007; H02G 15/013; H01B 11/22
See application file for complete search history.

(56) References Cited

U.S. PATENT DOCUMENTS 5,535,298 A   7/1996   Fasnacht et al.

FOREIGN PATENT DOCUMENTS

EP      2 450 729        5/2012
WO      WO 01/96921      12/2001

OTHER PUBLICATIONS

International Search Report and Written Opinion for International Application No. PCT/EP2014/064168 dated Sep. 22, 2014 (10 pages).

*Primary Examiner* — John Bedtelyon
(74) *Attorney, Agent, or Firm* — Merchant & Gould P.C.

(57) ABSTRACT

A cable element attachment system (300) attaches cable elements (80) to an entrance/exit location (140) of an enclosure (100). The system includes a base (600) and a clamp (700). The base attaches to the entrance/exit location and includes at least one slot (630), first gripping features (672), and a first attachment feature (664). The slot extends to an open end (632). The clamp includes second gripping features (772) positioned opposite of the first gripping features. Each of the gripping features grips the cable elements. The clamp further includes a second attachment feature (764) that attaches the clamp to the first attachment feature. The entrance/exit location may include a seal (Continued)

arrangement (500) that seals the cable elements to the entrance/exit location. The gripping features may deform the cable element both around its circumference and along its path and thereby retain the cable element.

24 Claims, 22 Drawing Sheets

(51) Int. Cl.
    *H02G 3/08*     (2006.01)
    *H02G 15/007*     (2006.01)
    *H02G 15/013*     (2006.01)
    *H01B 11/22*     (2006.01)

(52) U.S. Cl.
    CPC ............... *G02B 6/46* (2013.01); *H01B 11/22* (2013.01); *H02G 3/083* (2013.01); *G02B 6/4446* (2013.01); *H02G 15/007* (2013.01); *H02G 15/013* (2013.01)

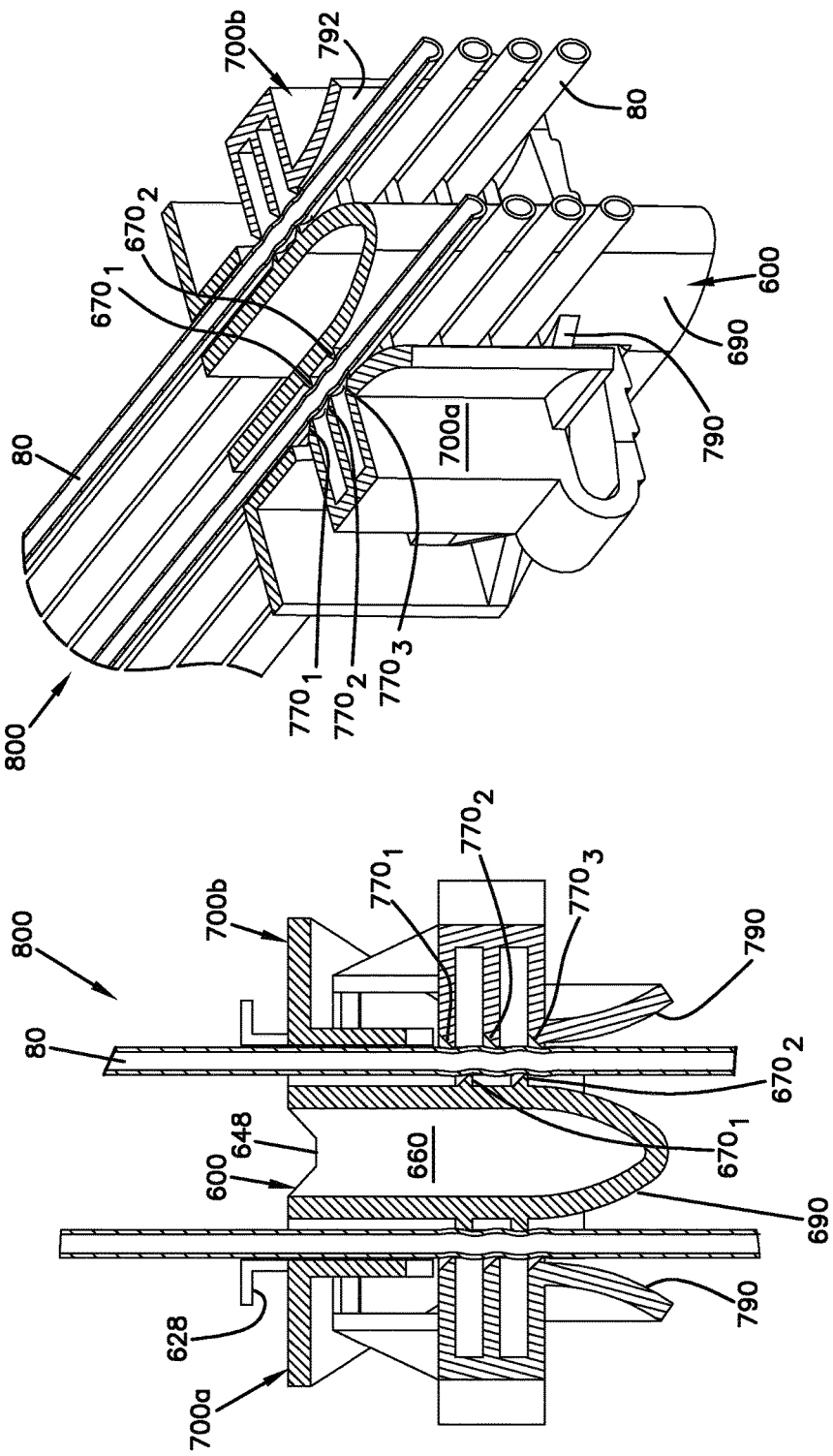

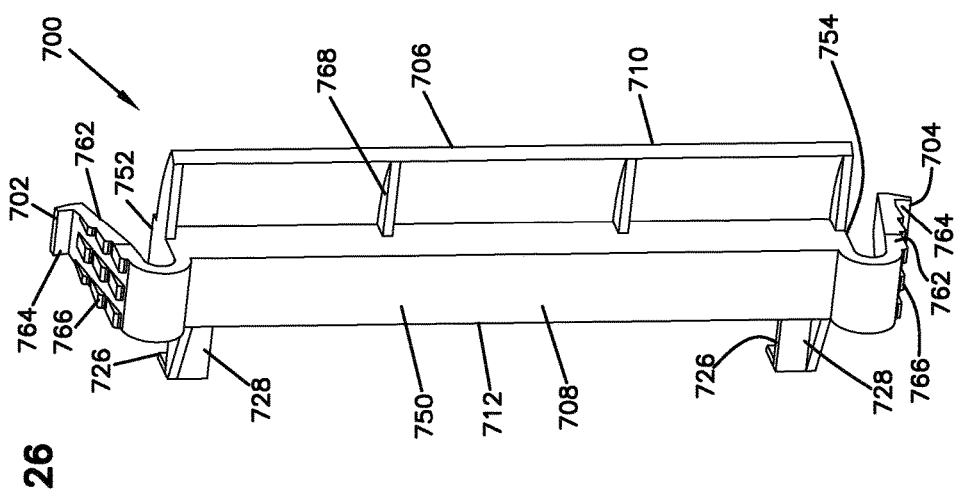

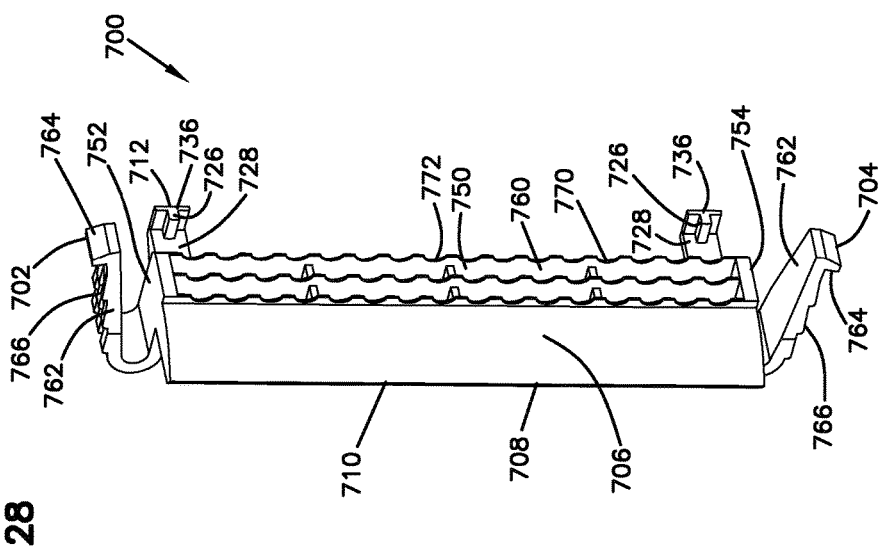

CLAMPING AND ATTACHMENT DEVICE FOR CABLE ELEMENT

CROSS-REFERENCE TO RELATED APPLICATION

This application is a National Stage of PCT/EP2014/064168, filed 3 Jul. 2014, which claims benefit of U.S. Patent Application Ser. No. 61/845,759 filed on 12 Jul. 2013, the disclosures of which are incorporated herein by reference in their entireties. To the extent appropriate, a claim of priority is made to each of the above disclosed applications.

BACKGROUND

Fiber optic networks typically have a plurality of optical fibers routed between a plurality of enclosures. The enclosures may serve as service points in the fiber optic network, include various optical and electrical components, and allow reconfiguration of the fiber optic network. The enclosures often have covers that allow access to an interior of the enclosure. A technician may open the cover and thereby access an interior of the enclosure for maintenance, reconfiguration, etc. Certain enclosures may be located in an outside environment and may be adapted to resist wind, rain, and/or other environmental exposure and thereby protect components located within the interior of the enclosure.

The enclosures may include entry and exit locations to allow the entry and exit of optical fibers, electrical conductors, etc. Certain entry and exit locations may be configured as holes through a wall of the enclosure. The holes may be made by punching out a knock-out in the wall of the enclosure. Especially in enclosures designed for outside environments, the holes may be sealed and thereby allow the entry and exit of the optical fibers, electrical conductors, etc. but prevent entry of moisture, insects, dirt, etc.

In certain enclosures, the entry and exit locations include a hole with a continuous perimeter. The optical fibers, electrical conductors, etc. are threaded through the hole and thereby gain entry and/or egress to/from the enclosure. In certain enclosures, a gland (e.g., a cable gland) may be used in conjunction with the hole to provide sealing at the hole. The optical fibers, electrical conductors, etc. are likewise threaded through the gland and thereby gain entry and/or egress to/from the enclosure.

Certain enclosures may include a plurality of holes and/or glands at various locations. Each hole and/or gland may provide entry and/or egress to/from the enclosure for a plurality of optical fibers and/or electrical conductors. Certain enclosures may accommodate 96 optical fibers that pass through three cable glands at three ports (i.e., holes). Thirty-two optical fibers may pass through each of the cable glands at each of the ports. The cable glands may accommodate optical fiber cable, electrical cable, conduit, and/or blown fiber tubes.

Cable fixation is also desired. Tie wraps and/or foam are known methods.

SUMMARY

According to certain aspects of the present disclosure, an optical fiber sheath attachment system attaches a plurality of optical fiber sheaths to an entrance/exit location of an enclosure. The optical fiber sheath attachment system includes an attachment base and a clamping member. The attachment base is adapted to attach to the entrance/exit location of the enclosure. The attachment base includes at least one slot, a plurality of first gripping features, and a first attachment feature. The slot extends to an open end and includes a first side and a second side. The plurality of first gripping features is positioned adjacent the first side of the slot. Each of the first gripping features is adapted to grip a corresponding one of the plurality of optical fiber sheaths. The clamping member includes a plurality of second gripping features that are positioned opposite of the first gripping features of the attachment base. Each of the second gripping features is adapted to grip a corresponding one of the plurality of optical fiber sheaths. The clamping member further includes a second attachment feature that is adapted to attach the clamping member to the first attachment feature of the attachment base.

In certain embodiments, bend control is provided by the optical fiber sheath attachment system.

In certain embodiments, the entrance/exit location of the enclosure includes a seal arrangement that is adapted to seal the plurality of optical fiber sheaths to the enclosure at the entrance/exit location. In one embodiment, the optical fiber sheath attachment system is mounted adjacent to the seal arrangement.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 18 is a partial cross-sectional plan view, as called out at FIG. 16, of the attachment base of FIG. 5 with the plurality of blown fiber tubes of FIG. 12 installed into the attachment base, and with the pair of clamping members of FIG. 8 attached to the attachment base;

FIG. 19 is a partial cross-sectional perspective view, as called out at FIG. 16, of the attachment base of FIG. 5 with the plurality of blown fiber tubes of FIG. 12 installed into the attachment base, and with the pair of clamping members of FIG. 8 attached to the attachment base;

FIG. 26 is another perspective view of the clamping member of FIG. 8;

FIG. 27 is still another perspective view of the clamping member of FIG. 8;

FIG. 28 is yet another perspective view of the clamping member of FIG. 8; and

FIG. 29 is still another perspective view of the clamping member of FIG. 8.

DETAILED DESCRIPTION

Figure 1:
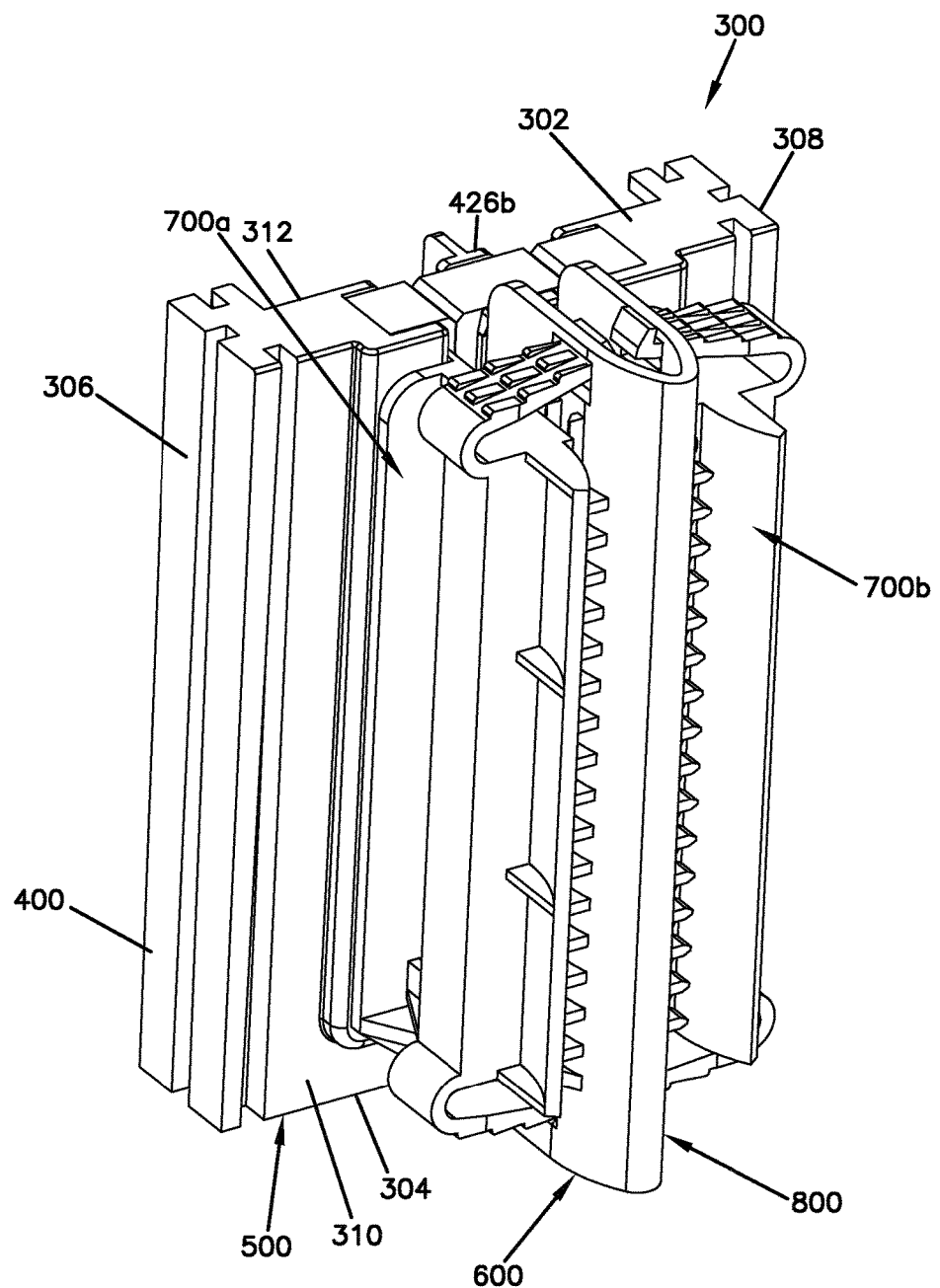
FIG. 1 is a perspective view of a sealing attachment assembly according to the principles of the present disclosure.

As mentioned above, a fiberoptic network typically includes a plurality of enclosures with a plurality of optical fibers routed between the enclosures. The enclosures and the optical fibers are often placed in outside environments and therefore require environmental protection for the optical fibers and various components within the enclosures. Environmental protection may be provided to the optical fibers by encasing the optical fibers in a fiberoptic cable. Alternatively, optical fibers may be blown through blown fibers tubes. Upon being blown through a blown fiber tube, the optical fiber is protected by the blown fiber tube. A plurality of optical fibers may be included within a single fiberoptic cable. Similarly, a plurality of blown fiber tubes may be bundled together and placed within a conduit. Upon the optical fibers, the optical fiber cables, and/or the blown fiber tubes reaching an enclosure, an entry location is typically provided and forms an intersection between the optical fibers, the optical fiber cables, and/or the blown fiber tubes. Especially in outside environments, environmental protection is typically provided at this intersection to prevent water, dirt, insects, etc. from entering either the enclosure or the fiberoptic cable, the blown fiber tube, etc.

A conventional method of providing entry to optical fibers, fiberoptic cables, blown fiber tubes, etc. is to provide a hole in a wall of the enclosure. A sealing device such as a cable gland may be provided at the hole and thereby seal the hole in the wall of the enclosure with the optical fiber, the fiberoptic cable, the blown fiber tube, and/or other cable element. Such an arrangement with a hole requires the cable element to be threaded through the hole and/or the cable gland.

According to the principles of the present disclosure, optical fibers, blown fiber tubes, fiberoptic cables, and/or other cable elements may be routed from an exterior of an enclosure to the interior of the enclosure without a need for threading the cable element through an entrance/exit location of the enclosure. In addition, a secure attachment is provided at the intersection between the cable element and the enclosure. Furthermore, sealing is provided at the intersection between the cable element and the enclosure. Furthermore, bend radius protection may be provided to the cable element.

According to the principles of the present disclosure, rather than threading the cable element, a system of slots is provided that allows the cable elements to be slid through the system of slots. Upon sliding the cable elements through the system of slots, the cable element may be secured to the enclosure, may be sealed to the enclosure, and/or bend radius protection may be provided.

In the examples provided and illustrated herein, blown fiber tubes are used to illustrate certain principles of the present disclosure. Blown fiber tubes are one example of cable elements 80 that may be used according to the principles of the present disclosure. Other cable elements 80 may include one or more fiberoptic cables, electrical cables, optical fiber sheaths, optical fibers, etc. In general, a cable element 80 may establish a route to transmit a telecommunications signal. Certain routes may be immediately able to transmit a telecommunications signal (e.g. a route established by an electrical cable). Other routes may not be immediately able to transmit a telecommunications signal (e.g. a route established by a blown fiber tube) but may be later adapted to carry a telecommunications signal (e.g., by blowing in an optical fiber through the blown fiber tube).

Turning now to FIG. 1, an example sealing/attachment assembly 300 (e.g., a cable element attachment system) is illustrated according to the principles of the present disclosure. The sealing/attachment assembly 300 includes a seal/support assembly 500 (e.g., a seal arrangement), and a clamping device 800. As illustrated at FIG. 1, the sealing/attachment assembly 300 is assembled without cable elements for the purpose of illustration.

Figure 2:
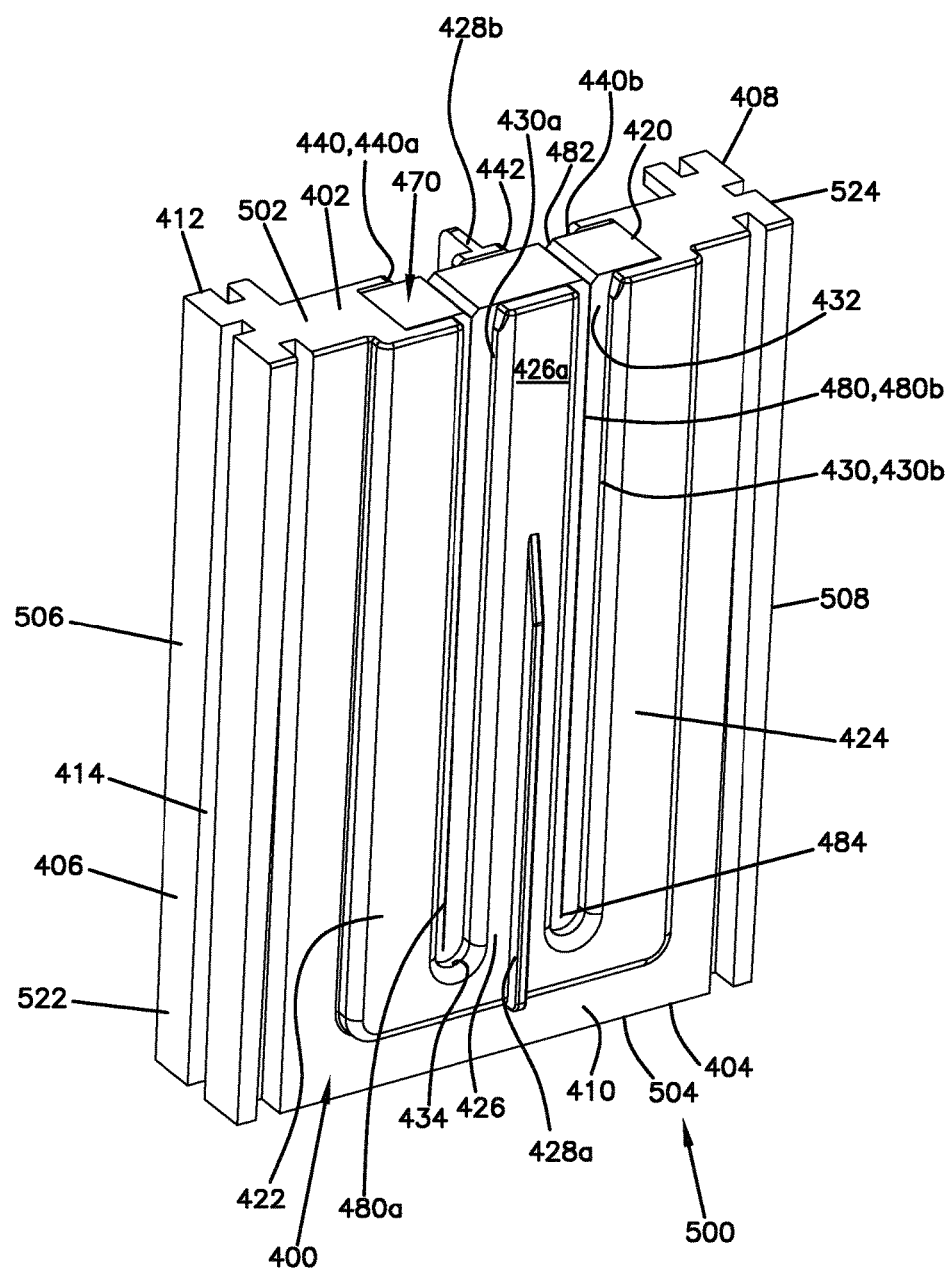
FIG. 2 is a perspective view of a seal/support assembly adapted for use in the sealing attachment assembly of FIG. 1.

Turning now to FIG. 2, the seal/support assembly 500 is illustrated and will now be described in detail. The seal/support assembly 500 extends from a first end 502 to a second end 504. As depicted, the first end 502 is an access end, and the second end 504 is a blind end. The access end 502 is the end from which cable elements 80 (see FIG. 6) may be installed and/or removed. The seal/support assembly 500 further includes a first side 506 and a second side 508. As depicted, the seal/support assembly 500 includes a support member 400 and a sealing member 470 (i.e., a seal).

In the following example embodiments, the example sealing/attachment assembly 300 is typically illustrated with blown fiber tubes 80 as the cable elements 80. In other embodiments, electrical cables, optical fibers, fiberoptic cables, optical fiber sheaths, and/or other cable elements 80 may be used in place of or alongside the blown fiber tubes 80. An optical fiber sheath may include any suitable extruded material that is adapted to hold and/or protect an optical fiber. The optical fiber may be factory installed in the optical fiber sheath (e.g. the fiber optic cables) and/or the optical fiber may be field installed in the optical fiber sheath (e.g. the blown fiber tubes 80). The optical fiber may be installed in the optical fiber sheath before installing the optical fiber sheath in the sealing/attachment assembly 300 (e.g. the fiber optic cable and/or the blown fiber tube 80) and/or the optical fiber may be installed in the optical fiber sheath after installing the optical fiber sheath in the sealing/attachment assembly 300 (e.g. the blown fiber tube 80).

The support member 400 includes an access end 402 and a blind end 404. The access end 402 generally coincides with the access end 502, and the blind end 404 generally coincides with the blind end 504. The support member 400 further includes a first side 406 and a second side 408. A first slide 522 is formed at the first side 405 of the support member 400, and a second slide 524 is formed at the second side 408 of the support member 400. As will be described hereinafter, the first and second slides 522, 524 allow the seal/support assembly to be slid into and out of an enclosure.

The support member 400 further includes an outside flange face 410 and an inside flange face 412. The support member 400 includes a plurality of slots 414 that generally extend between the access end 402 and the blind end 404.

The support member 400 includes a seal receiver 420. As depicted, the seal receiver 420 is generally rectangular. As depicted, the seal receiver 420 includes a first C-shaped portion 422 and a second C-shaped portion 424. In-between the C-shaped portions 422, 424, a center portion 426 is positioned. The center portion 426 includes a first member 426a and a second member 426b (see FIG. 1). The first center member 426a may include a first rib 428a, and the second center member 426b may include a second rib 428b.

A pair of outer receiving slots 430 is formed between the first center member 426a and the first and second C-shaped portions 422, 424. In particular, an outer receiving slot 430a is formed between the first C-shaped portion 422 and the first center member 426a, and a second outer receiving slot 430b is formed between the second C-shaped portion 424 and the first center member 426a. The outer receiving slots 430 extend between an access end 432 and a blind end 434. The access end 432 generally coincides with the access end 402.

A pair of inner receiving slots 440 is formed between the second center member 426b and the first and second C-shaped portions 422, 424. In particular, an inner receiving slot 440a is formed between the first C-shaped portion 422 and the second center member 426b, and a second inner receiving slot 440b is formed between the second C-shaped portion 424 and the second center member 426b. The inner receiving slots 440 extend between an access end 442 and a blind end 444. The access end 442 generally coincides with the access end 402.

As depicted, the sealing member 470 is generally rectangular. The sealing member 470 generally extends between the first C-shaped portion 422 and the second C-shaped portion 424. The sealing member 470 includes a pair of sealing slots 480. In particular, a first sealing slot 480a generally coincides with the receiving slots 430a and 440a, and a second sealing slot 480b generally coincides with the receiving slots 430b and 440b. The sealing slots 480 extend between an access end 482 and a blind end 484. The access end 482 generally coincides with the access end 402. The sealing member 470 is made of a rubber or a rubber-like material that is compliant and seals against blown fiber tubes 80 when the blown fiber tubes 80 are inserted into the sealing slots 480.

Figure 3:
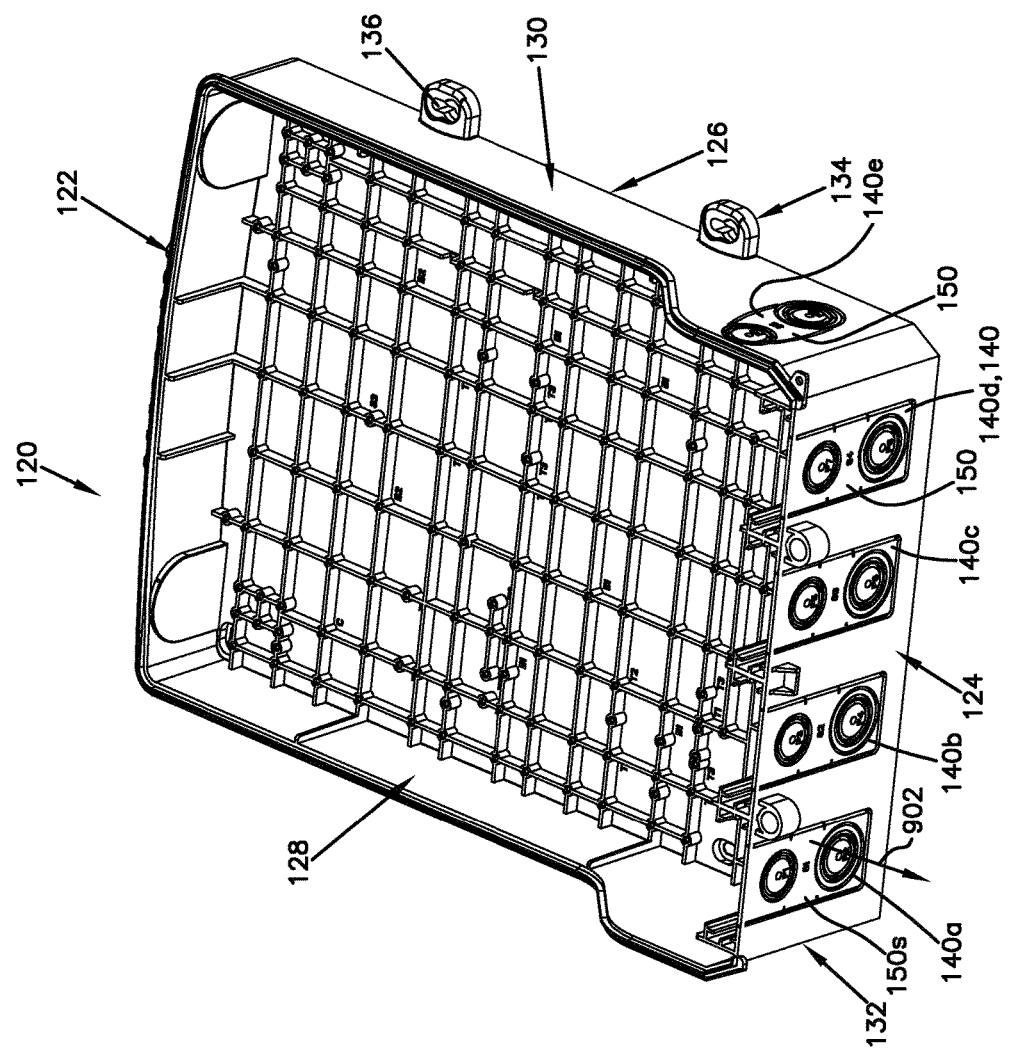
FIG. 3 is a perspective view of a housing base of an enclosure.

Turning now to FIG. 3, a base 120 of an enclosure assembly 100 is illustrated and will now be described in detail. The enclosure 100 also typically includes a cover 116 (see FIG. 9). Together, the base 120 and the cover 116 provide an interior 142 and an exterior 144 of the enclosure 100. The cover 116 may hinge on the base 120 at a hinge axis Ah. The enclosure 100 extends between a first end 102 and a second end 104. As depicted, the first end 102 may be a top end, and the second end 104 may be a bottom end. The enclosure assembly 100 typically further includes a base end 106 and an access end 108. The base end 106 is typically used as a mounting surface for the enclosure assembly 100. The access end 108 may be opened by opening the cover 116 and thereby provide access to the interior 142 of the enclosure 100. The enclosure 100 further includes a third end 110 and a fourth end 112. A sealing perimeter 118 is typically formed between the cover 116 and the base 120. As depicted, the sealing perimeter 118 is routed along the first end 102, the second end 104, the third end 110, and the fourth end 112. As will be further described hereinafter, the sealing perimeter 118 may further include the access end 502 of the seal/support assembly 500.

Returning to FIG. 3, the base 120 includes a first end 122 and a second end 124. As depicted, the first end 122 is a top end, and the second end 124 is a bottom end. The base 120 further includes a base end 126 and an access end 128. The base end 126 generally coincides with the base end 106 of the enclosure assembly 100. The access end 128 is typically covered by the cover 116 when the cover 116 is in a closed position. The base 120 further includes a third end 130 and a fourth end 132. As depicted, mounting feet 134 may be provided at the third end 130 and the fourth end 132 adjacent the base end 126. The mounting feet 134 may include fastener attachment points 136 that accommodate fasteners for mounting the enclosure assembly 100. A sealing lip 146 may extend generally around the access end 128 of the base. As depicted, the sealing lip 146 generally extends along the third end 130, the first end 122, and the fourth end 132 (see FIG. 4).

As depicted, the base 120 of the enclosure assembly 100 includes a plurality of potential fiber entry locations 140 (i.e., entry/exit locations). In particular, five potential fiber entry locations 140a-e are provided. As depicted, the fiber entry locations 140 each include removable portions 150. The removable portions 150 are configured as hole forming removable portions 150h and slot forming removable portions 150s. The removable portions 150h may be arranged in various sizes within other larger hole forming removable portions 150h. The hole forming removable portions 150h may further be within the slot forming removable portion 150s. Upon removing (i.e., knocking out) one of the removable portions 150, a fiber entry location 140 is established in a form of a hole or a slot, respectively.

Figure 4:
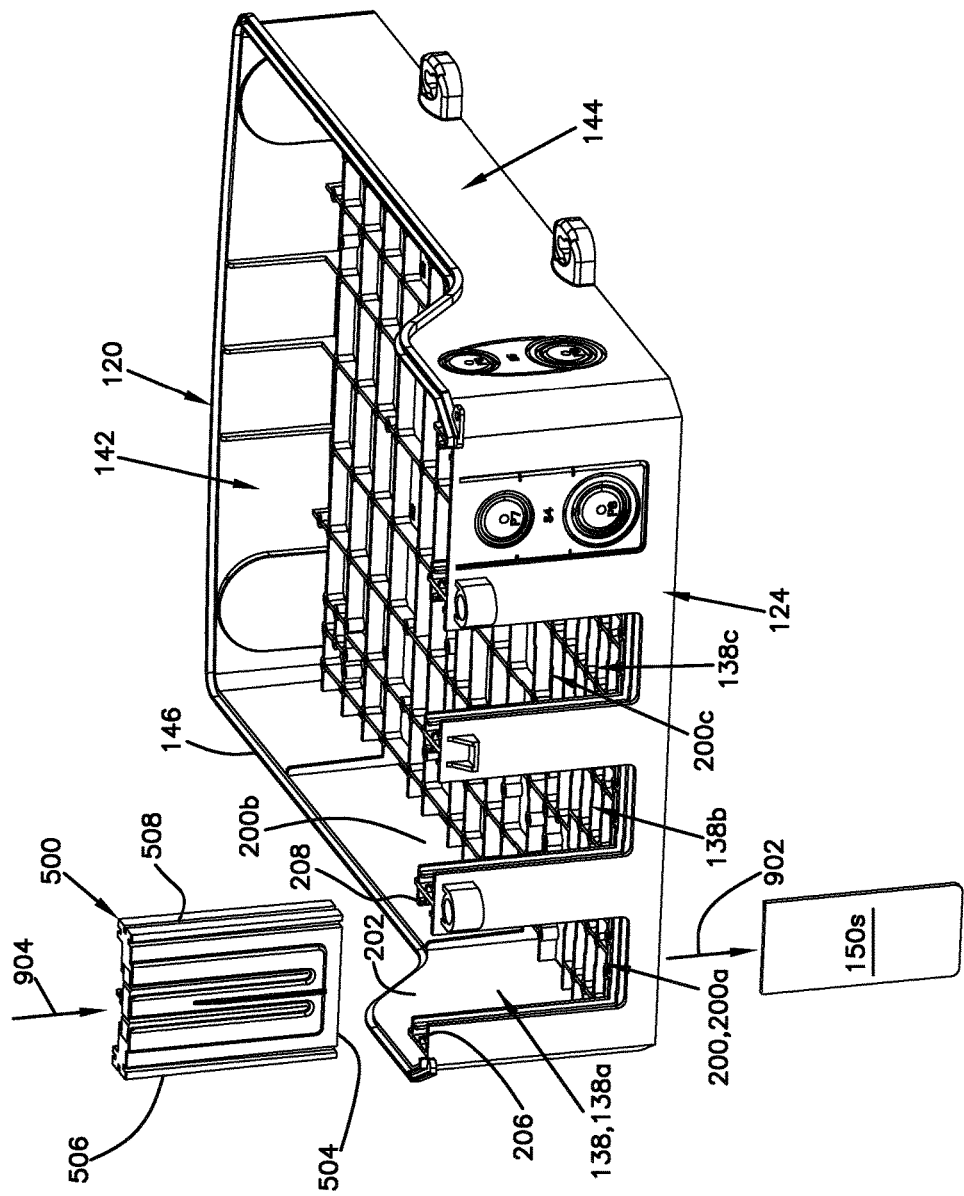
FIG. 4 is a perspective view of the housing base of FIG. 3, but with three removable portions of the housing base removed thereby providing three receivers for three of the sealing attachment assemblies of FIG. 1, and with one of the seal/support assemblies of FIG. 2 positioned to be inserted into one of the three receivers.

Turning now to FIG. 4, additional aspects of the base 120 will be described in detail. As depicted at FIG. 4, when the slot forming removable portions 150s are removed from the base 120 of the enclosure 100, a receiver 200 is formed. As depicted at FIG. 4, three of the removable portions 150s have been removed and a first receiver 200a, a second receiver 200b, and a third receiver 200c have been formed. The receivers 200 each include an open end 202 and a blind end 204 opposite the open end 202. The receivers 200 further include a first side 206 and a second side 208. As further illustrated at FIG. 10, the receivers 200 include an outside flange 210 and an inside flange 212. The receivers 200 further include protrusions 214. As depicted, the protrusions 214 include a wedge shape and/or a tapered shape. The receiver 200 includes a slide structure 220. As depicted, the slide structure 220 includes a first rail 222 and an opposite second rail 224. In the depicted embodiment, the slide structure 220 is adapted to receive the seal/support assembly 500. In particular, a first slide 522 of the seal/support assembly 500 may engage and slide along the first rail 222, and the second slide 524 is adapted to similarly slide along the second rail 224. Furthermore, the slots 414 of the support member 400 engage the protrusions 214 and may thereby form a labyrinth seal. In addition, the engagement of the slots 414 with the protrusions 214 may provide additional strength. The receivers 200 of the base 120 may thereby attach to the sealing/attachment assembly 300, and the sealing/attachment assembly 300 may fill a void left in the base 120 upon removal of the slot forming removable portion 150s.

An overview of a process of installing the sealing/attachment assembly 300 and the corresponding blown fiber tubes 80 will now be given according to the principles of the present disclosure. A first step 902 of the process includes the removal of the slot forming removable portion 150s, as previously described. The differences between FIGS. 3 and 4 illustrate the step 902.

Figure 5:
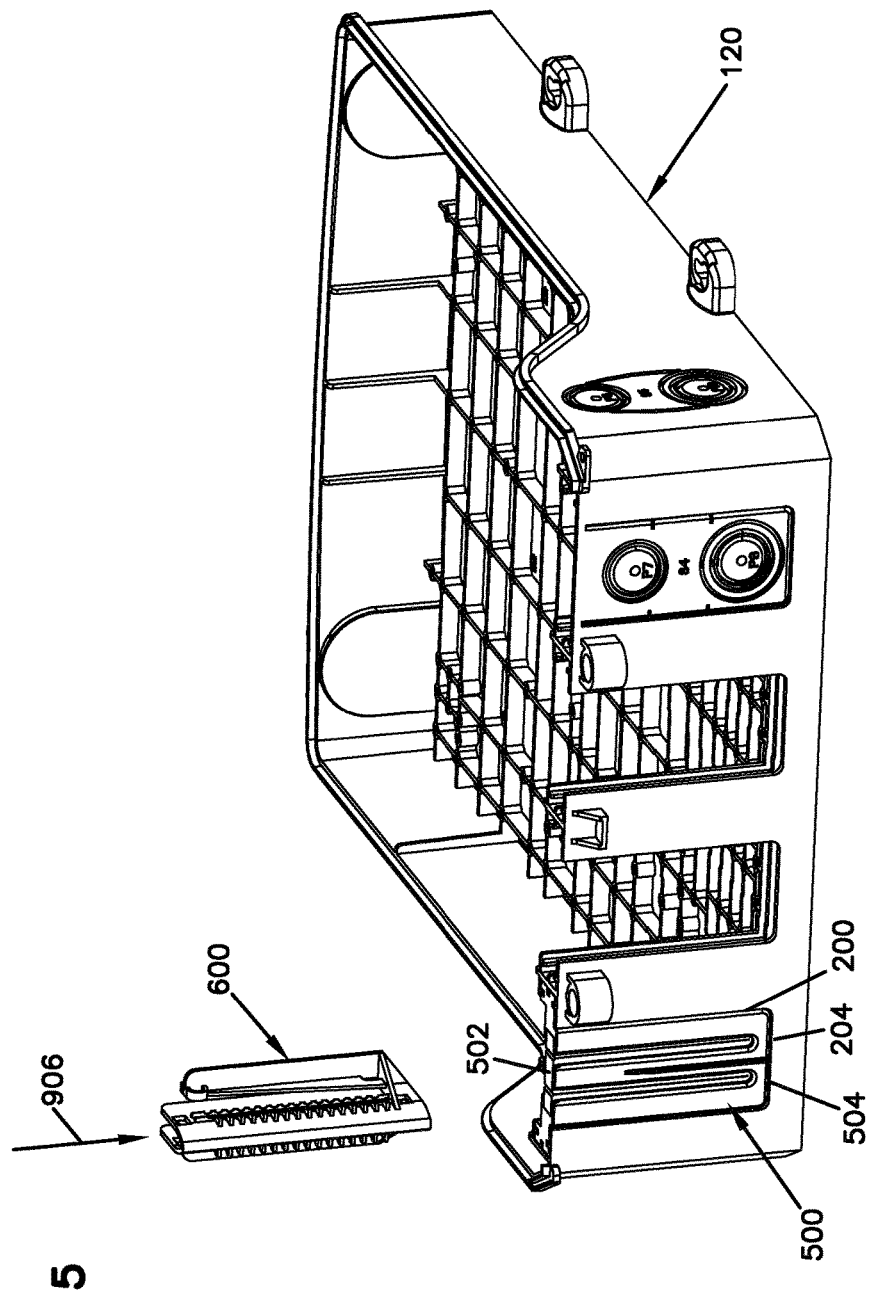
FIG. 5 is a perspective view of the housing base of FIG. 3 with the one of the seal/support assemblies of FIG. 2 installed in the one of the receivers of FIG. 4, and with an attachment base, adapted for use in the sealing attachment assembly of FIG. 1, positioned to be inserted into the installed seal/support assembly.

A second step 904 of the process includes sliding the seal/support assembly 500 into the receiver 200. As illustrated at FIG. 4, the seal/support assembly 500 is positioned and aligned with the receiver 200. In particular, the first rail 222 is aligned with the first slide 522 and the second rail 224 is aligned with the second slide 524. The seal/support assembly 500 is then inserted into the receiver 200 until the blind end 504 bottoms out against the blind end 204 of the receiver 200 (see FIG. 10). The access end 502 is thus positioned generally along the sealing perimeter 118 of the enclosure 100, as illustrated at FIG. 5.

Figure 6:
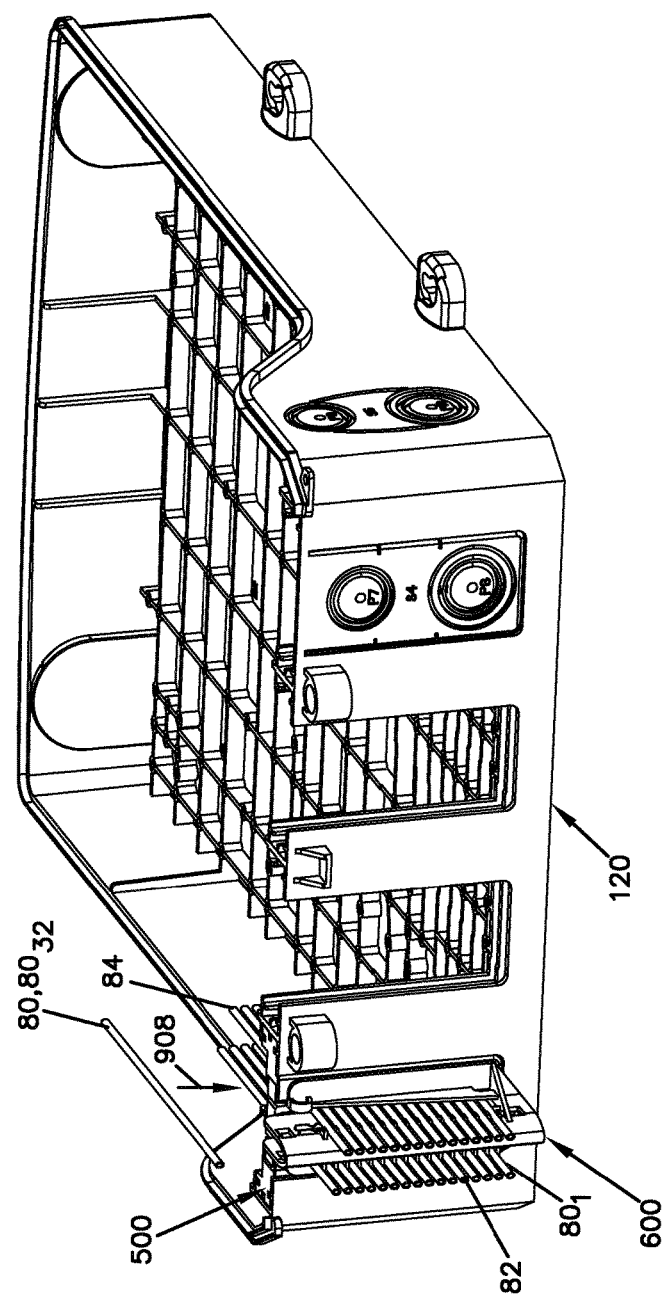
FIG. 6 is a perspective view of the housing base of FIG. 3 with the attachment base of FIG. 5 installed into the installed seal/support assembly, and with a plurality of blown fiber tubes installed into the installed seal/support assembly and the installed attachment base and with a remaining blown fiber tube positioned to be inserted into the installed seal/support assembly and the installed attachment base.

A third step 906 of the process includes inserting an attachment base 600 into a portion of the seal/support assembly 500. The attachment based 600 is thereby connected to the seal/support assembly 500. The differences between FIGS. 5 and 6 illustrate the insertion of the attachment base 600 into the seal/support assembly 500.

Figure 7:
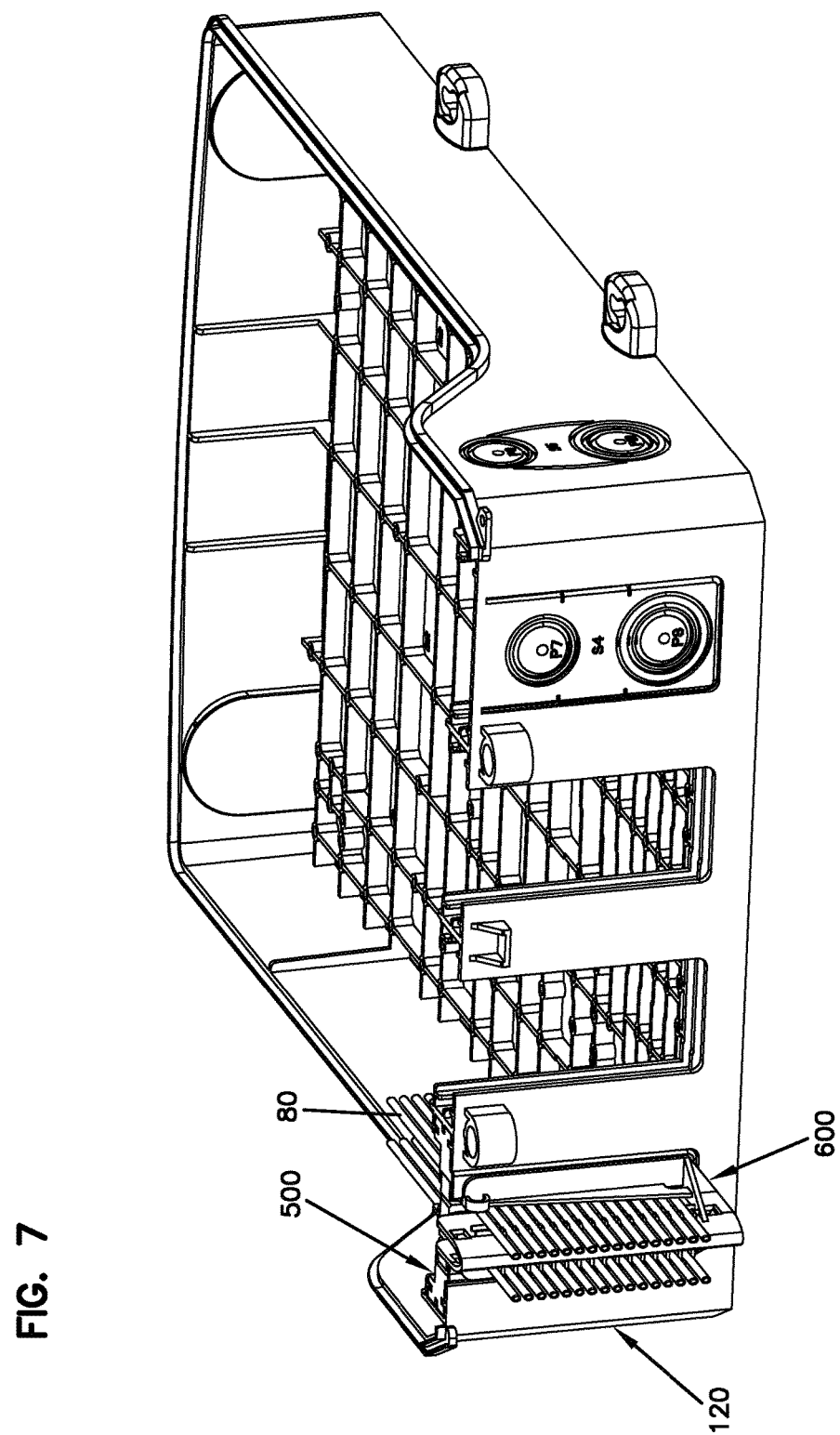
FIG. 7 is the perspective view of FIG. 6, but with the remaining blown fiber tube installed.
Figure 8:
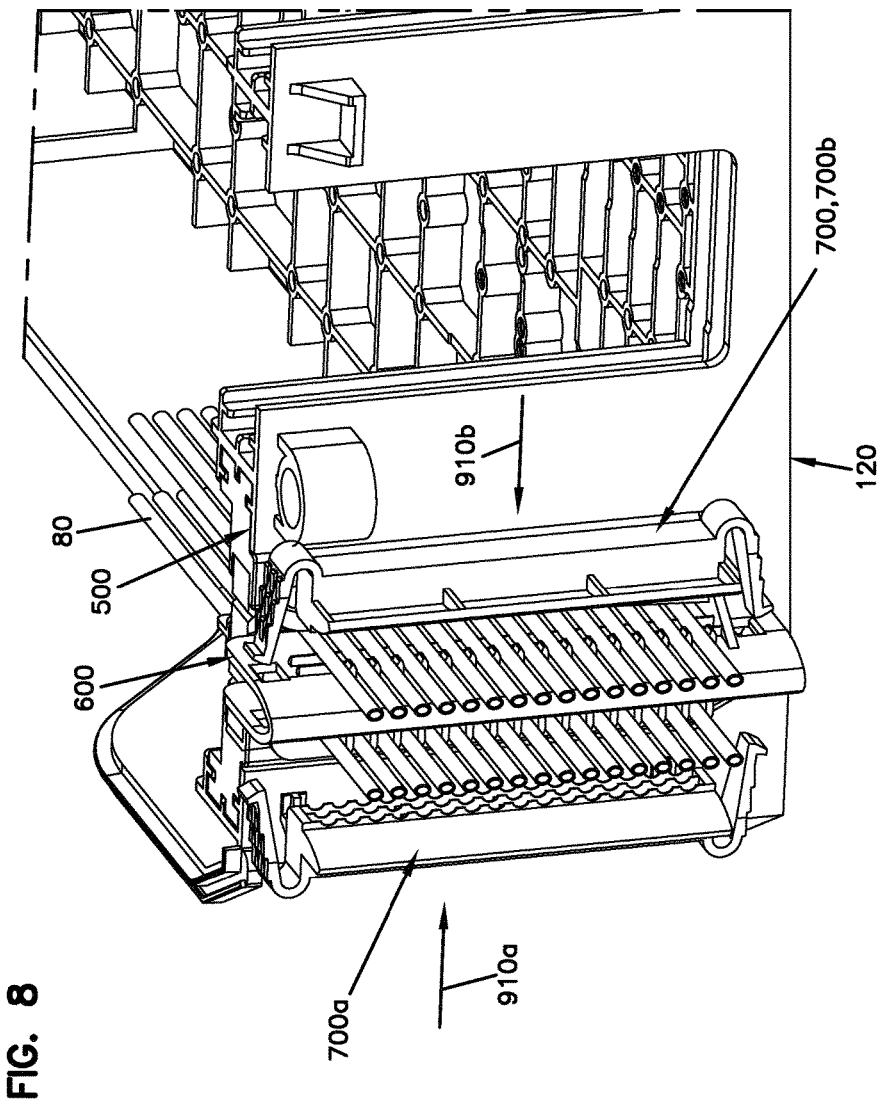
FIG. 8 is an enlarged partial perspective view of the installed blown fiber tubes, the installed seal/support assembly, the installed attachment base, and the housing base with a pair of clamping members positioned to be installed into the installed attachment base.

A fourth step 908 of the process includes installing a plurality of the blown fiber tubes 80 into slots of the attachment base 600 and seal/support assembly 500. As illustrated at FIG. 6, thirty-one of the blown fiber tubes 80 have been inserted into the slots of the attachment base 600 and the seal/support assembly 500 with a thirty-second blown fiber tube 80 in process of being installed. At FIG. 7, a total of 32 blown fiber tubes 80 are shown installed into the slots of the attachment base 600 and seal/support assembly 500. As illustrated at FIG. 6, second ends 84 of the blown fiber tubes 80 are thus positioned within the interior 142 of the enclosure assembly 100. First ends 82 of the blown fiber tubes 80 remain outside of the enclosure assembly 100.

A fifth step 910 of the process includes installing a pair of clamping members 700 (i.e., clamps) into the attachment base 600 and thereby clamping and securing the blown fiber tubes 80. In the depicted embodiment, a first clamping member 700a and a second clamping member 700b each attach on opposite sides to the attachment base 600. Thus, the step 910 may be broken down into step 910a of installing the first clamping member 700a and a step 910b of installing the second clamping member 700b.

Figure 9:
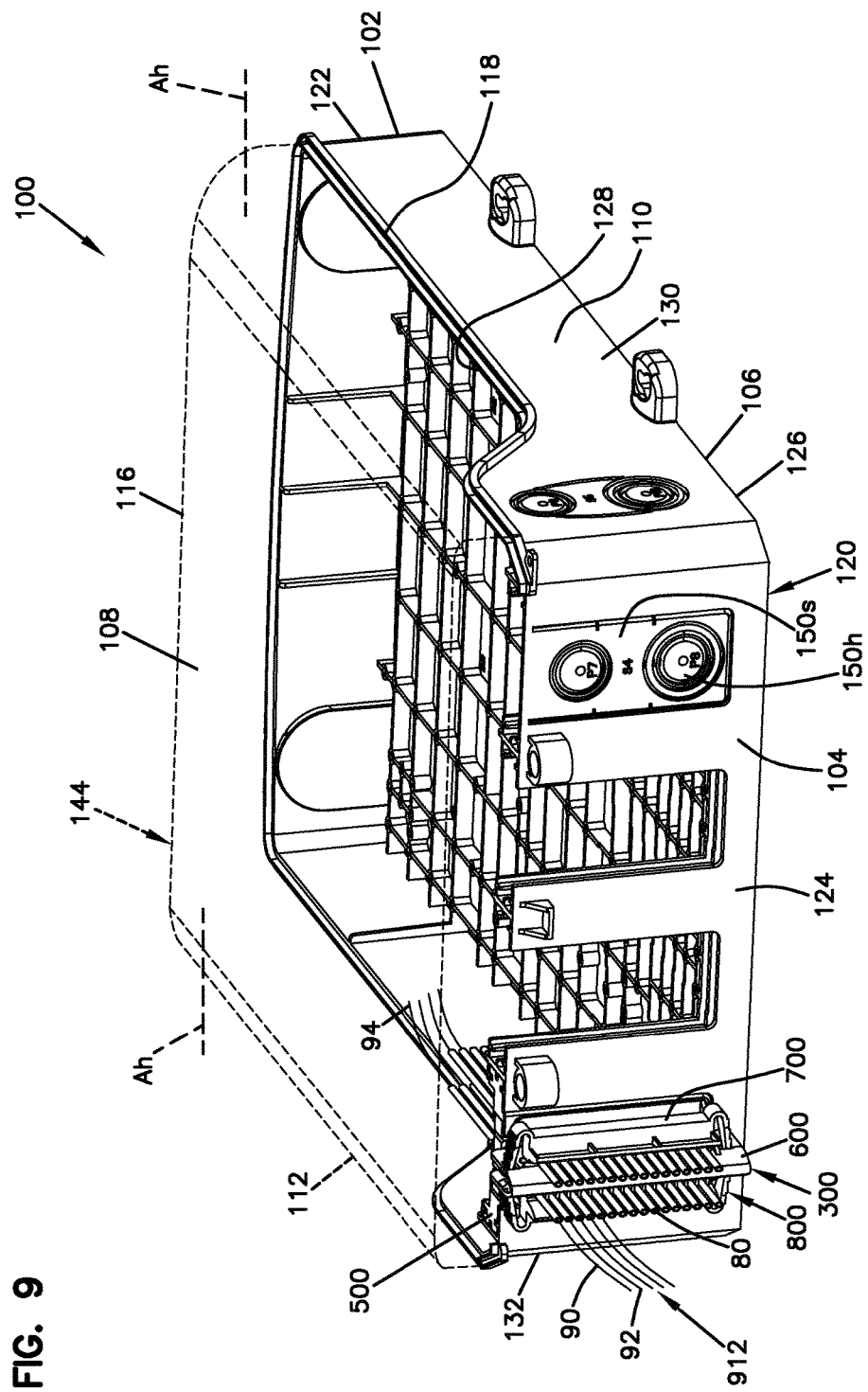
FIG. 9 is a perspective view of the installed blown fiber tubes, the installed seal/support assembly, the installed attachment base, the installed pair of clamping members, a housing cover, shown in dashed line, and the housing base with a plurality of optical fibers installed in respective ones of the blown fiber tubes.

A sixth step 912 of the process includes blowing in optical fibers 90 through one or more of the blown fiber tubes 80. FIG. 9 generally illustrates the concept of blowing the optical fiber 90 through the blown fiber tubes 80 and thereby passing a second end 94 of the optical fiber 90 from outside the exterior 114 of the enclosure assembly 100 to the interior 142 of the enclosure assembly 100. A first end 92 of the optical fibers 90 remains outside of the enclosure assembly 100.

Although the steps of the process above were numbered, other sequences may also be used in installing the various components mentioned above.

Turning now to FIGS. 12-15, a sequence of installing 32 blown fiber tubes 80 into the clamping device 800 is illustrated. The blown fiber tubes 80 may thereby be pre-installed into the clamping device 800 before the clamping device 800 is installed onto the seal/support assembly 500. At FIG. 12, the step 908 of installing the blown fiber tubes 80 into the attachment base 600 is in process, and at FIG. 13 this portion of the step 908 is complete. A remaining portion of installing the plurality of blown fiber tubes 80 into the sealing slots 480 of the sealing member 470 may be completed upon the clamping device 800 being secured to the plurality of blown fiber tubes 80 (see FIG. 15). Between FIGS. 13 and 14, the step 910b is accomplished by attaching the clamping member 700b to the attachment base 600. Likewise, between FIGS. 14 and 15, the step 910a is illustrated. In particular, the clamping member 700a is clamped over a left half of the plurality of blown fiber tubes 80 as the clamping member 700a is attached to the attachment base 600.

Figure 17:
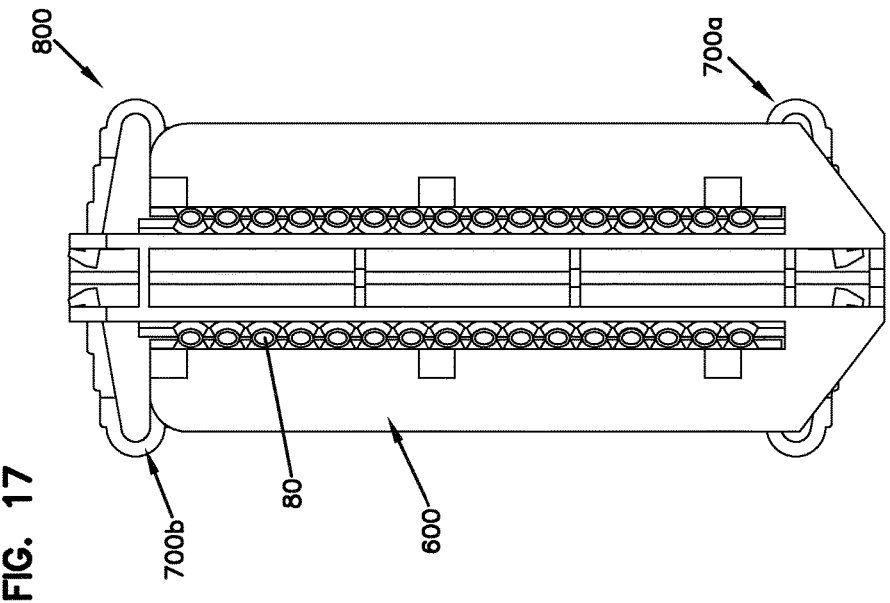
FIG. 17 is a rear elevation view of the attachment base of FIG. 5 with the plurality of blown fiber tubes of FIG. 12 installed into the attachment base, and with the pair of clamping members of FIG. 8 attached to the attachment base.
Figure 16:
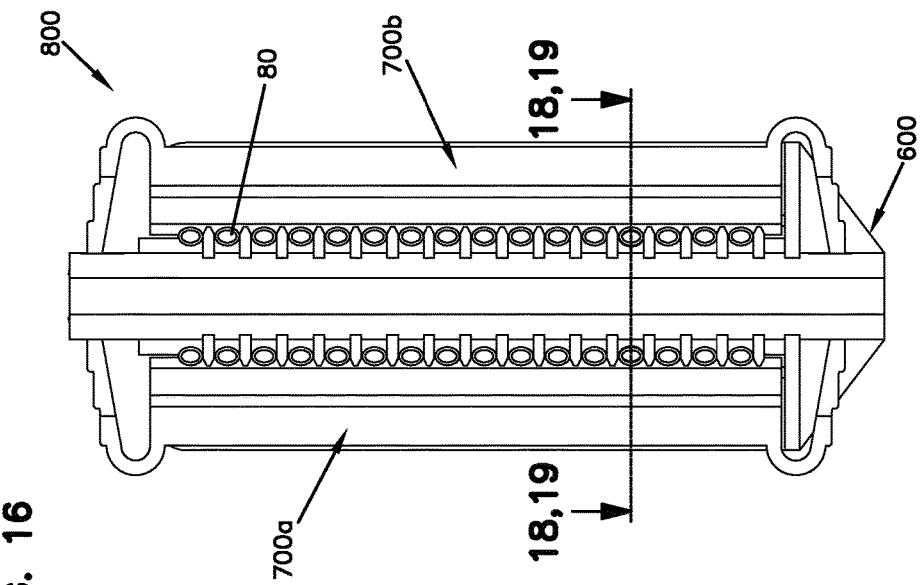
FIG. 16 is a front elevation view of the attachment base of FIG. 5 with the plurality of blown fiber tubes of FIG. 12 installed into the attachment base, and with the pair of clamping members of FIG. 8 attached to the attachment base.

Turning now to FIGS. 16-19, additional illustrations are provided that show the various features and relationships of the pair of clamping members 700, the attachment base 600, and the plurality of blown fiber tubes 80. In particular, FIGS. 16 and 17 illustrate that the clamping device 800 deforms the normally circular cross-section of the blown fiber tube 80 into an oval shape. In the depicted embodiment, a circumference around the blown fiber tube 80 remains substantially the same when deformed into the oval shape by the clamping device 800. The deformation of the blown fiber tube 80 from the circular cross-section to the oval cross-section assists in retaining the blown fiber tube 80 to the clamping device 800. The deformation of the blown fiber tube 80 does not prevent the ability to blow the optical fibers 90 through the blown fiber tubes 80.

Turning now to FIGS. 18 and 19, a deformation imparted by the clamping device 800 on the plurality of blown fiber tubes 80 is illustrated. In particular, a plurality of grip protrusions 670 on the attachment base 600 and a plurality of grip protrusions 770 on the pair of clamping members 700 causes a path of the blown fiber tubes 80 to undulate and thereby deforms the plurality of blown fiber tubes 80. The deformation of the blown fiber tubes 80 imposed by the clamping device 800 does not prevent the optical fibers 90 from being blown through the blown fiber tubes 80.

FIGS. 18 and 19 further illustrate bend radius protection provided to the blown fiber tubes by the clamping device 800. In particular, the attachment base 600 includes a pair of bend radius limiters 690. Similarly, the clamping member 700 includes a bend radius limiter 790. In certain embodiments, as illustrated at FIGS. 18 and 19, bend radius protection is provided along a direction perpendicular to a stack direction of the stacked blown fiber tubes 80. In other embodiments, bend radius protection may be provided in other directions. In certain embodiments, bend radius protection may be provided to the blown fiber tubes 80 in all directions.

Turning now to FIGS. 20-24, the attachment base 600 will be described in detail. The attachment base extends from a first end 602 to a second end 604. The attachment base 600 includes a first side 606 and a second side 608. The attachment base 600 includes an outward side 610 and an inward side 612. In the depicted embodiment, the attachment base 600 includes a pair of arms 640. In particular, the pair of arms 640 includes a right arm 640R and a left arm 640L. In the depicted embodiment, the arms 640R, 640L are mirror images of each other. The arms 640 extend between a first end 642 and a second end 644. The arms 640 may further include a rib 646 (i.e., a stiffener). In the depicted embodiment, the rib 646 is tapered and becomes smaller toward the first end 642. A base 650 extends between the right arm 640R and the left arm 640L. The base 650 may include a horizontal rib 652 that extends from the first side 606 to the second side 608.

As depicted, the base 650 is adjacent to the second end 604. A holding member 660 (e.g., a central member) is positioned between the right arm 640R and the left arm 640L and extends outwardly beyond the arms 640 to the outward side 610. The holding member 660 includes a wall structure 662. The wall structure 662 includes a right portion 662R and a left portion 662L.

The bend radius limiters 690 may be included on the wall structure 662. In particular, a right bend radius limiter 690R may be included on the right portion 662R. Likewise a left bend radius limiter 690L may be included on the left portion 662L. The holding member 660 extends upwardly from the base 650 and extends between the first end 602 and the second end 604.

The holding member 660 may include a pair of latch holes 664 (i.e., attachment features). The latch holes 664 are adapted to receive latches 764 (i.e., attachment features) of the clamping members 700. The holding member 660 may further include a pair of latch holes 666. The latch holes 666 may also be adapted to receive the latch 764. The latch holes 664 are positioned toward the second end 604 and include a right latch hole 664R and a left latch hole 664L. The latch holes 666 are positioned toward the first end 602 and include a right latch hole 666R and a left latch hole 666L.

Figure 21:
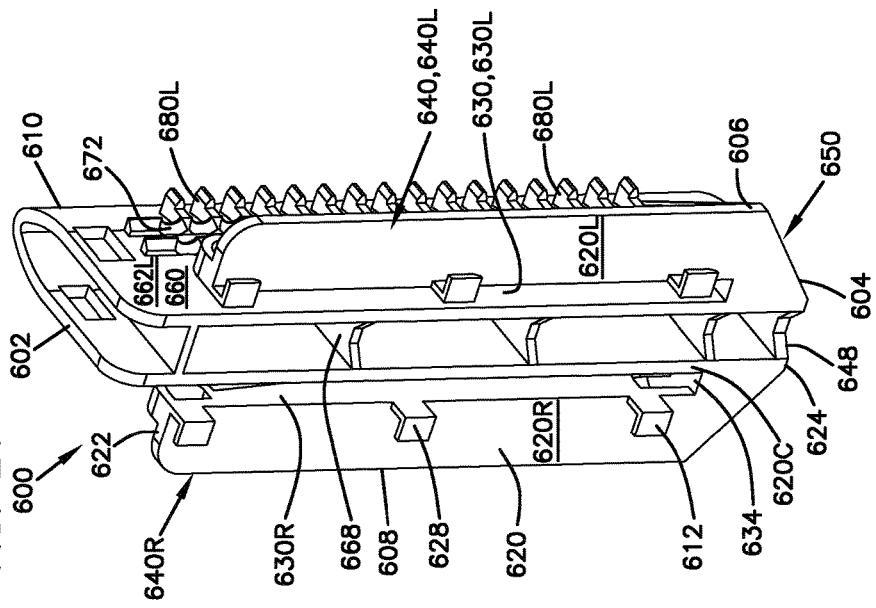
FIG. 21 is another perspective view of the attachment base of FIG. 5.
Figure 20:
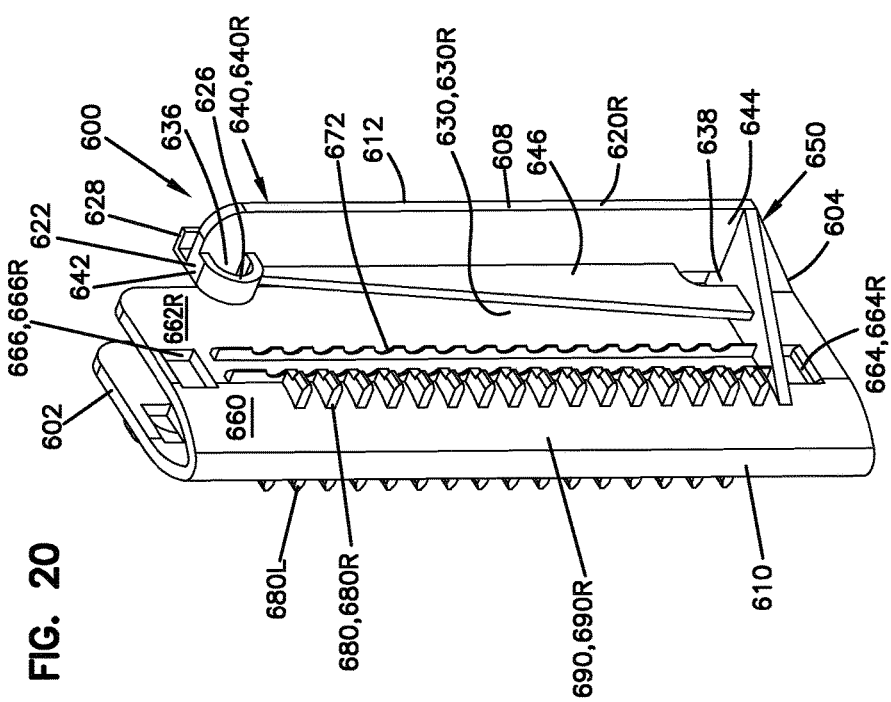
FIG. 20 is a perspective view of the attachment base of FIG. 5.
Figure 23:
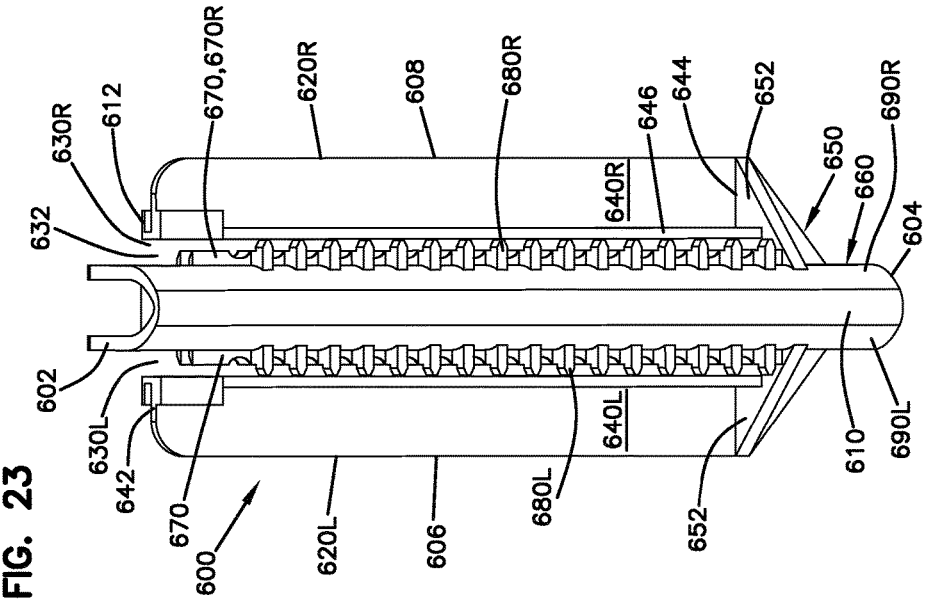
FIG. 23 is yet another perspective view of the attachment base of FIG. 5.
Figure 22:
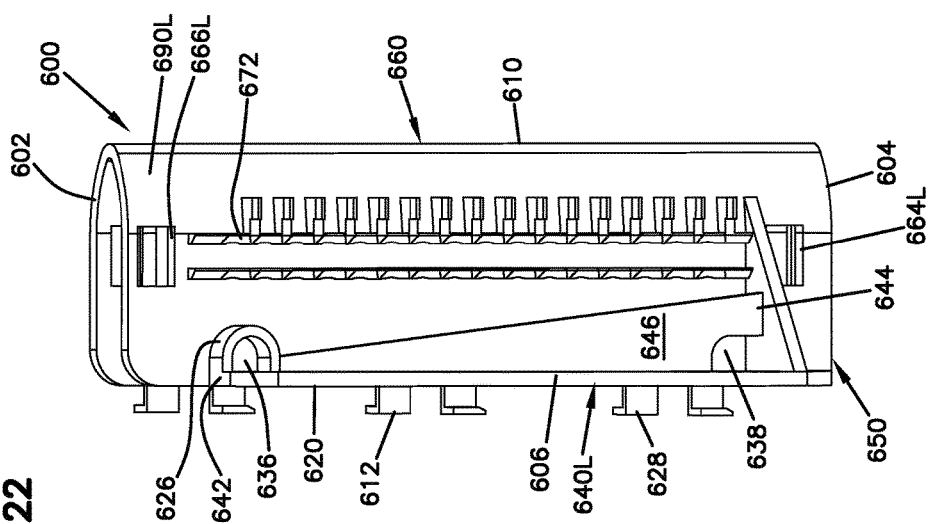
FIG. 22 is still another perspective view of the attachment base of FIG. 5.
Figure 25:
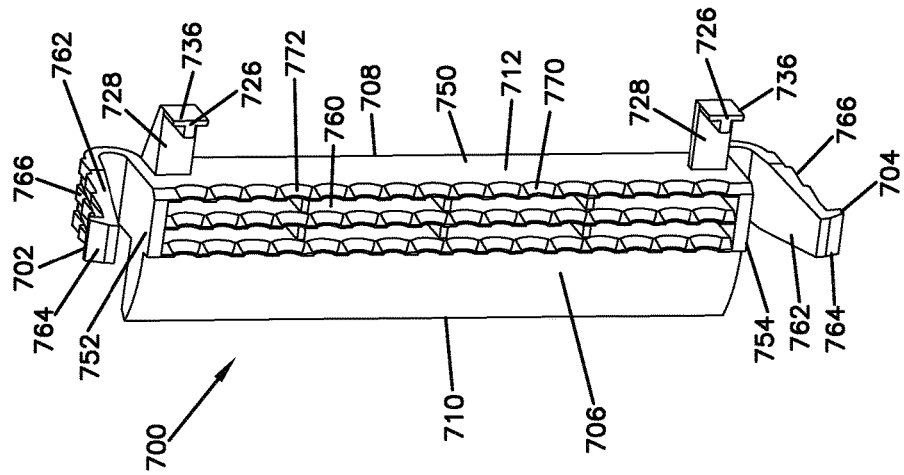
FIG. 25 is a perspective view of the clamping member of FIG. 8.
Figure 24:
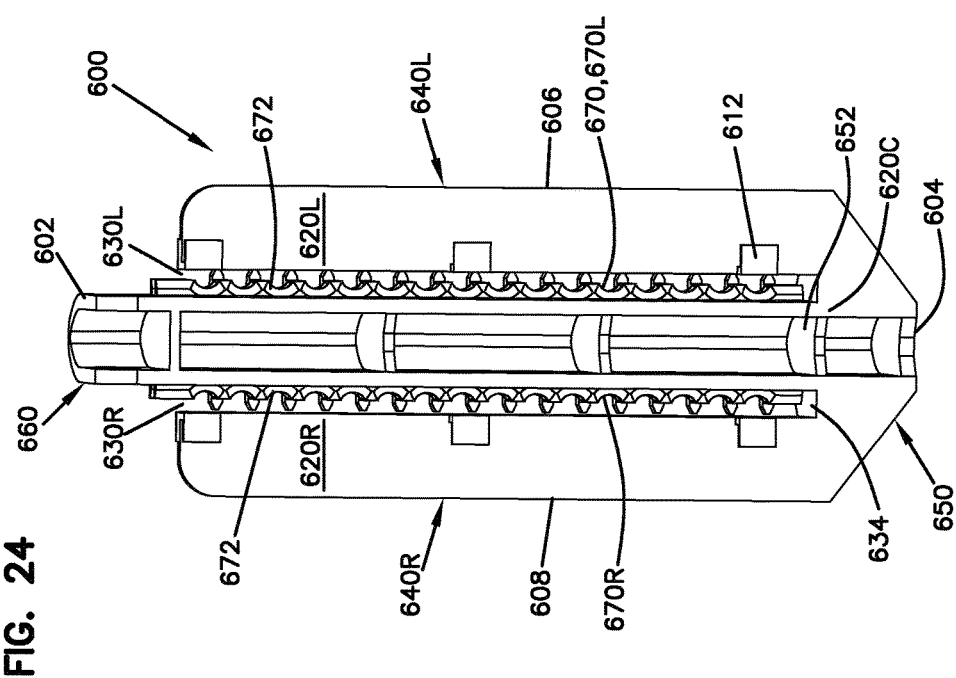
FIG. 24 is still another perspective view of the attachment base of FIG. 5.

The holding member may further include a plurality of ribs 668 (see FIG. 21). The rib 668 may extend between the right portion 662R and the left portion 662L. A relief 648 adapted to clear the first rib 428a of the seal/support assembly 500 may be included on the rib 668. The holding member 660 may further include the grip protrusion 670. A first set of grip protrusion 670R may be positioned on the right portion 662R. Likewise, a second set of grip protrusion 670L may be positioned on the left portion 662L. As illustrated at FIGS. 18 and 19, the grip protrusions 670R and 670L may each include a first grip protrusion $670_1$ and a second grip protrusion $670_2$.

As mentioned above, the plurality of grip protrusions 670 may cause the blown fiber tubes 80 to follow an undulating path. In particular, the grip protrusion 670 include a plurality of grips 672 (i.e., gripping features). The plurality of grips respectively cradle one of the blown fiber tubes 80. The grips 672 may include a shape of a half-oval. The grips 672 thereby deform the blown fiber tubes 80 both along the undulating path and circumferentially around the perimeter of the blown fiber tubes 80.

The holding member 660 may further include a plurality of guides 680. In particular, a first set of guides 680R are positioned on the right portion 662R and a second set of the guides 680L are positioned on the left portion 662L. The guides 680 may be generally used to position the plurality of blown fiber tubes 80 before the clamping members 700 are applied. In particular, the blown fiber tube 80 may be positioned between a pair of the guides 680. As depicted, the uppermost blown fiber tubes 80 only include a guide 680 below them.

The attachment base 600 further includes a pair of tube slots 630. In particular a right tube slot 630R is formed between the arm 640R and the right portion 662R Likewise, a left tube slot 630L is formed between the arm 640L and the left portion 662L. The tube slots 630 extend between an open end 632 and a blind end 634. The open end 632 of the tube slot 630 is adapted to receive a plurality of the blown fiber tubes 80. As the blown fiber tubes 80 are installed in the tube slots 630, they may be bent slightly and thereby positioned between respective pairs of the guides 680. Thus, the guides 680, in conjunction with the tube slots 630 may loosely hold the blown fiber tubes 80 in position before the installation of the clamping members 700.

The attachment base 600 further includes a pair of connectors 636 and a pair of connectors 638. As depicted, the connectors 636 are a first pair of receivers adapted to connect to connector 736 of the clamping members 700. The connectors 638 are depicted as second receivers that also receive the connector 736.

Figure 10:
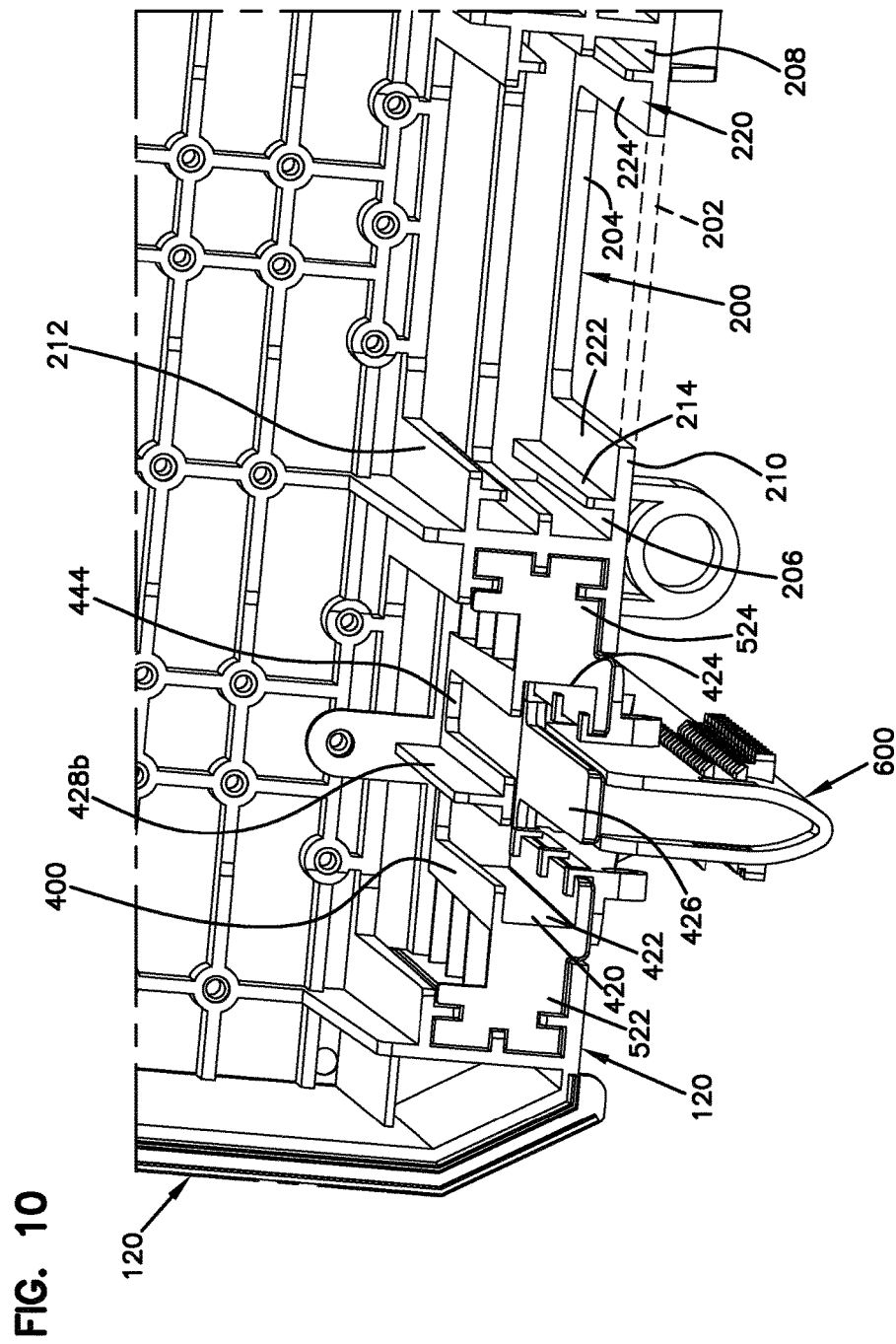
FIG. 10 is an enlarged partial perspective view of the housing base of FIG. 3 with the seal/support assembly of FIG. 2 installed in the one of the receivers of FIG. 4, with the attachment base of FIG. 5 installed into the seal/support assembly, and with a sealing member of the seal/support assembly hidden thereby revealing a connection between the seal/support assembly and the attachment base.
Figure 11:
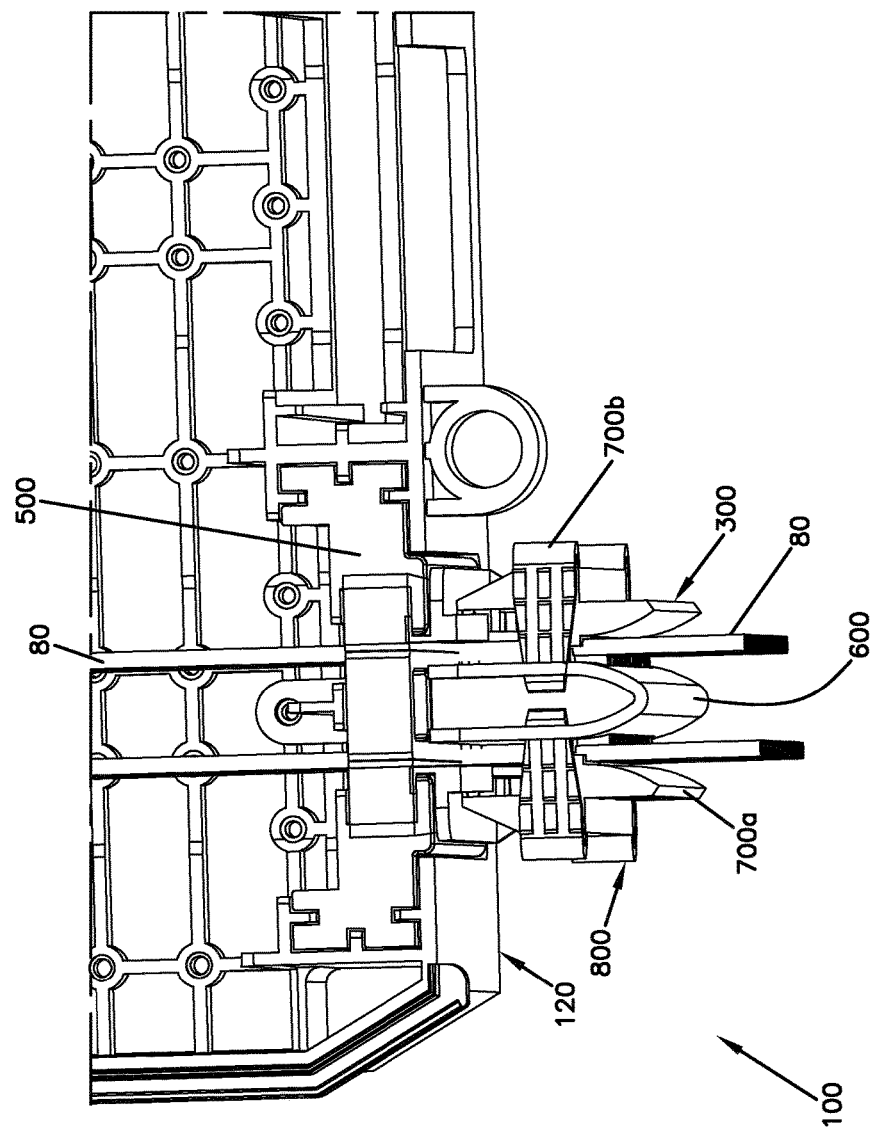
FIG. 11 is an enlarged partial perspective view of the housing base of FIG. 3 with the seal/support assembly of FIG. 2 installed in the one of the receivers of FIG. 4, with the attachment base of FIG. 5 installed into the seal/support assembly, with the plurality of blown fiber tubes of FIG. 7 installed into the installed seal/support assembly, and with the pair of clamping members of FIG. 8 installed into the attachment base.
Figure 12:
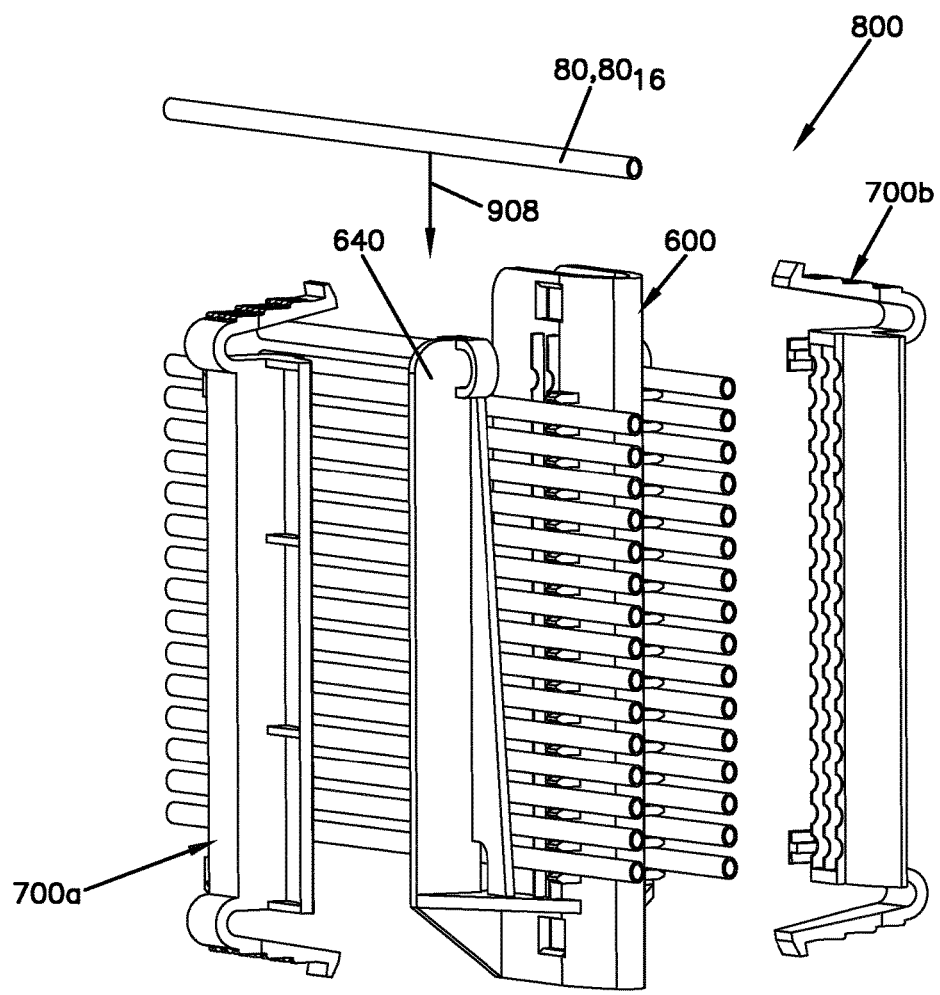
FIG. 12 is a perspective view of the attachment base of FIG. 5 with a plurality of blown fiber tubes installed into the attachment base, with a remaining blown fiber tube positioned to be inserted into the attachment base, and with the pair of clamping members of FIG. 8 positioned to be attached to the attachment base.
Figure 13:
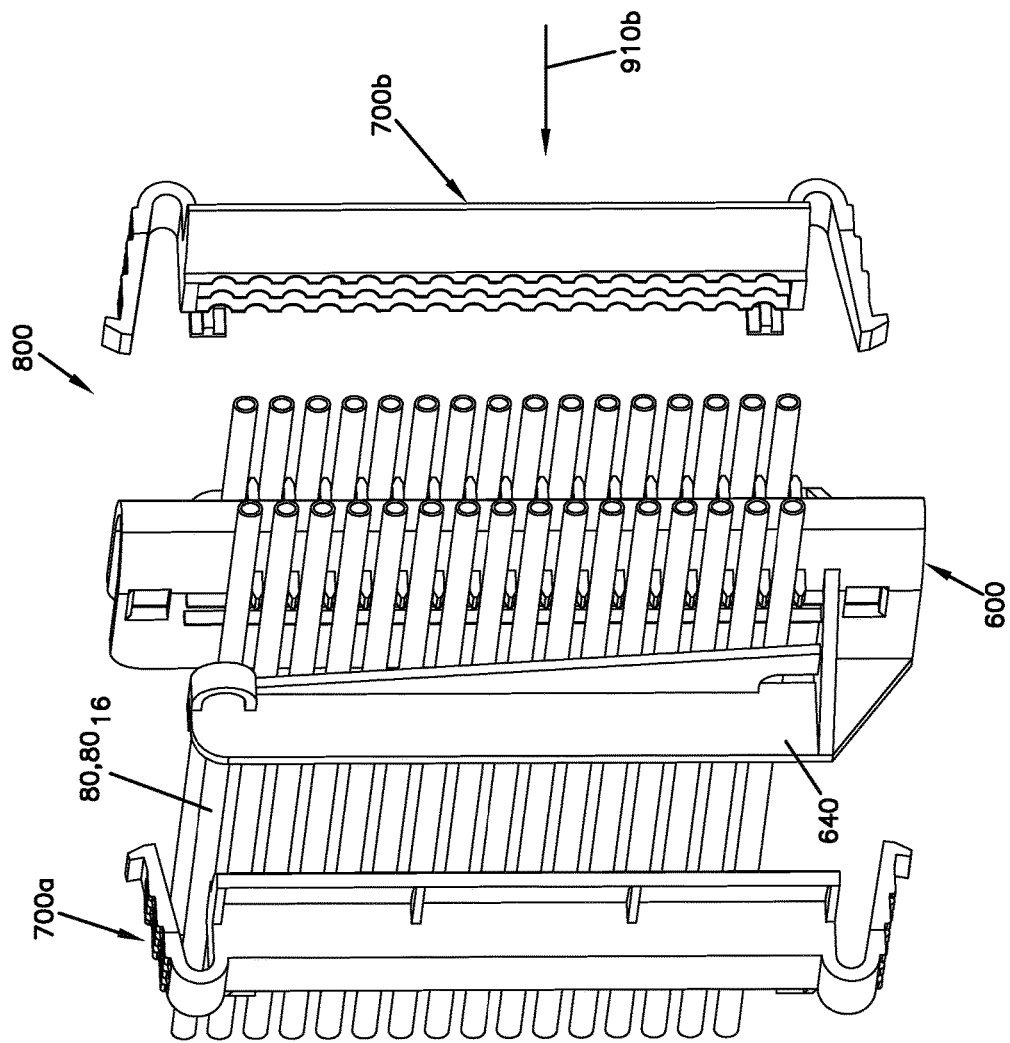
FIG. 13 is the perspective view of FIG. 12, but with the remaining blown fiber tube installed.
Figure 14:
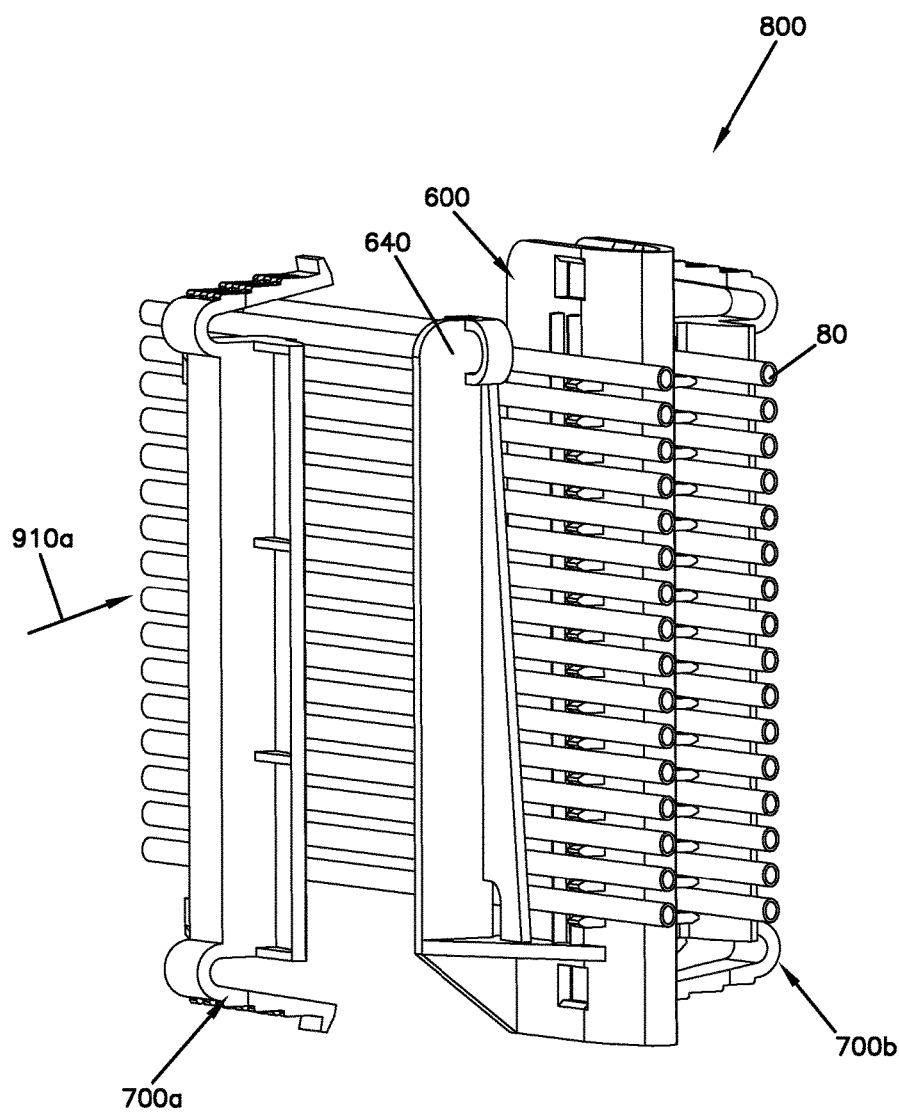
FIG. 14 is the perspective view of FIG. 13, but with one of the pair of clamping members of FIG. 8 attached to the attachment base.
Figure 15:
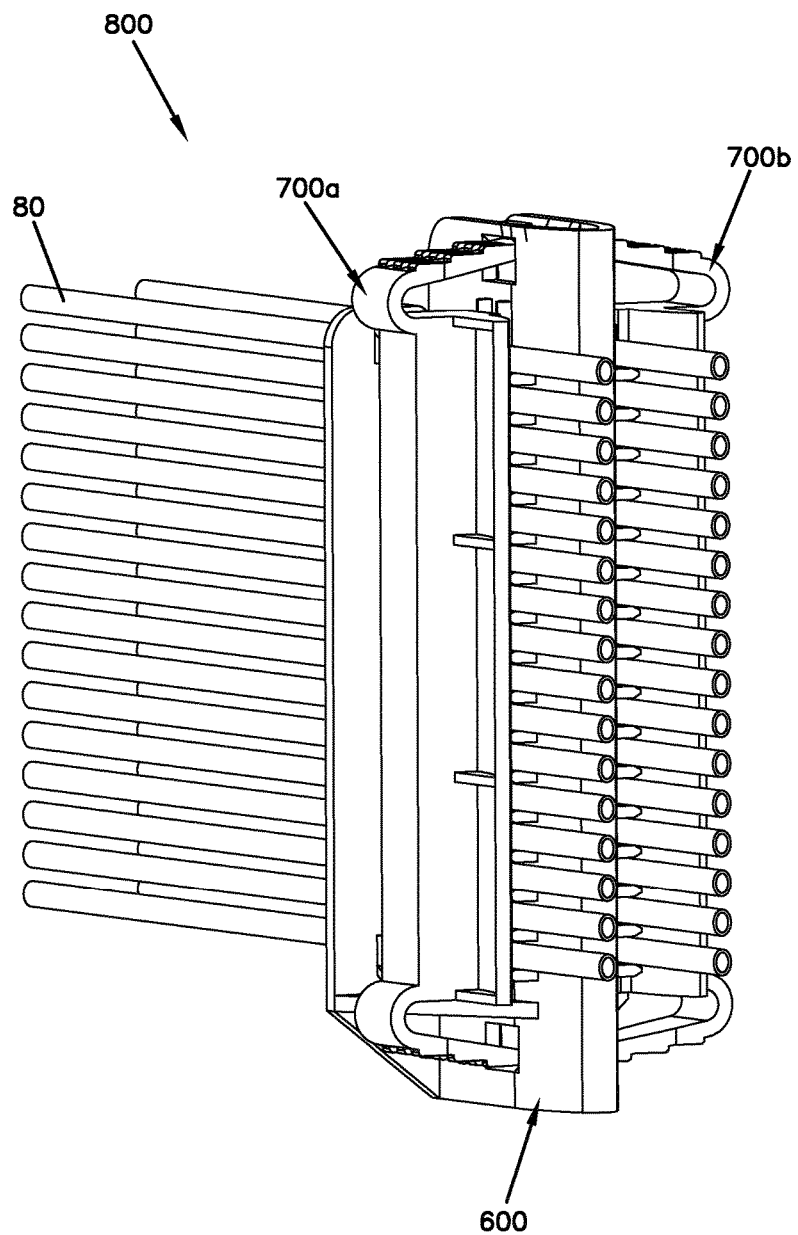
FIG. 15 is the perspective view of FIG. 14, but with both of the pair of clamping members of FIG. 8 attached to the attachment base.

As depicted, the attachment base 600 further includes mounting flanges 620. The mounting flanges 620 extend between a first end 622 and a second end 624. The mounting flanges include a right mounting flange 620R and a left mounting flange 620L. As depicted, the mounting flanges 620 are components of a respective one of the arms 640. The mounting flanges 620 may be used to attach the attachment base 600 to the seal/support assembly 500. A plurality of hooks 628 may extend from the mounting flanges 620. As depicted at FIG. 10, the mounting flanges 620 in conjunction with the hooks 628 attach to the first and second C-shaped portions 422, 424. The hooks 628 may extend through the outer receiving slots 430 of the support member 400. The mounting flanges 620 in conjunction with the hooks 628 form a C-shaped structure that may slide along an outer wall defined by the first C-shaped portion 422 and the second C-shaped portion 424. The attachment base 600 may thereby slide in and out of the seal/support assembly 500. The sealing member 470 (hidden in FIG. 10) may assist in retaining the attachment base 600 on the seal/support assembly 500.

Turning now to FIGS. 25-29, the clamping member 700 will be described in detail. The clamping member 700 extends between a first end 702 and a second end 704. The clamping member 700 includes a first side 706 and a second side 708. The clamping member 700 includes an outward side 710 and an inward side 712. A support structure 750 extends between a first end 752 and a second end 754. At each of the first and second ends 752, 754 a resilient arm 762 extends toward a respective one of the latches 764. A grip (e.g., a finger grip) 766 is provided on the resilient arm 762. The latches 764 engage the latch holes 664 or 666. By compressing the pair of the grips 766 together, the latches 764 may be released. Tapers on the latch 764 and the latch holes 664 and 666 may allow the latches 764 to automatically engage the latch holes 664 or 666, respectively.

The support structure 750 may support the bend radius limiter 790. The support structure 750 may define a holding member 760. The holding member 760 may define a plurality of grip protrusions 770. In the depicted embodiment, the holding member 760 includes three grip protrusions $770_{1-3}$. Each of the grip protrusions 770 defines a plurality of grips 772 (i.e., gripping features). The grips 772 cradle the blown fiber tube 80 in a similar manner as the grips 672. The grips 772 are positioned opposite the blown fiber tube 80 from the grips 672. The grips 772 are further staggered with the grips 672. The grips 672 and 772 work together to both deform the blown fiber tube 80 in an undulating shape along the length of the blown fiber tube 80 and may further act to deform the blown fiber tubes 80 from a circular cross-section to an oval cross-section.

The clamping member 700 may further include an attachment protrusion 726 that extends from the support structure 750 on an arm 728. The attachment protrusion 726 may form the connector 736 that engages either the connector 636 or the connector 638 of the attachment base 600.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

PARTS LIST

Ah hinge axis
80 cable element
$80_{1-32}$ blown fiber tubes
82 first end
84 second end
90 optical fiber
92 first end
94 second end
100 enclosure assembly
102 first end (top)
104 second end (bottom)
106 base end
108 access end
110 third end
112 fourth end
116 cover
118 sealing perimeter
120 base
122 first end (top)
124 second end (bottom)
126 base end
128 access end
130 third end
132 fourth end
134 mounting feet
136 fastener attachment points
138 fiber entrance openings
140 fiber entry locations
140a-e fiber entry locations
142 interior F4
144 exterior
146 sealing lip
150 removable portion
150h hole forming removable portion
150s slot forming remove able portion
200 receiver
202 open end
204 blind end
206 first side
208 second side
210 outside flange
212 inside flange
214 protrusions
220 slide structure
222 first rail
224 second rail
300 sealing attachment assembly
302 access end
304 blind end
306 first side
308 second side
310 outside
312 inside
400 support member
402 access end
404 blind end
406 first side
408 second side
410 outside flange face
412 inside flange face
414 slots
420 seal receiver
422 first C-shaped portion
424 second C-shaped portion
426 center portion
426a center member
426b center member
428a first rib
428b second rib
430 outer receiving slots
430a outer receiving slot
430b outer receiving slot
432 access end
434 blind end
440 inner receiving slots
440a inner receiving slots
440b inner receiving slots
442 access end
444 blind end
470 sealing member 480 sealing slots
480a sealing slot
480b sealing slot
482 access end
484 blind end
500 seal/support assembly
502 access end
504 blind end
506 first side
508 second side
522 first slide
524 second slide
600 attachment base
602 first end
604 second end
606 first side
608 second side
610 outward side
612 inward side
620 mounting flanges
620R mounting flange
620L mounting flange
620C mounting feature
622 first end
624 second end
626 loop
628 hooks
630 tube slots
630R tube slot
630L tube slot
632 open end
634 blind end
636 connector
638 connector
640 arm
640R arm
640L arm
642 first end
644 second end
646 rib
648 relief
650 base
652 horizontal rib
660 holding member
662 wall
662R right portion
662L left portion
664 latch holes
664R latch hole
664L latch hole
666 latch holes
666R latch hole
666L latch hole
668 rib
670 grip protrusions
670R grip protrusion
670L grip protrusion
$670_1$ grip protrusion
$670_2$ grip protrusion
672 grip
680 guides
680R guide
680L guide
690 bend radius limiters
690R bend radius limiter
690L bend radius limiter
700 clamping members
700a clamping member
700b clamping member
702 first end
704 second end
706 first side
708 second side
710 outward side
712 inward side
726 attachment protrusion
728 arm
736 connector
750 support structure
752 first end
754 second end
760 holding member
762 resilient arm
764 latch
766 grip
768 rib
770 grip protrusions
$770_1$ grip protrusion
$770_2$ grip protrusion
$770_3$ grip protrusion
772 grip
790 bend radius limiters
800 clamping device
902 step 1
904 step 2
906 step 3
908 step 4
910a step 5a
910b step 5b
912 step 6

What is claimed is:

1. A cable element attachment system for attaching a plurality of cable elements to an entrance/exit location of an enclosure, the cable element attachment system comprising:
an attachment base adapted to attach to the entrance/exit location of the enclosure, the attachment base including:
at least one slot that extends to an open end, the at least one slot including a first side and a second side;
a plurality of first gripping features positioned adjacent the first side of the slot, each of the first gripping features adapted to grip a corresponding one of the plurality of cable elements; and
a first attachment feature;
at least one clamping member including a plurality of second gripping features positioned opposite of the first gripping features of the attachment base, each of the second gripping features adapted to grip a corresponding one of the plurality of cable elements, the clamping member further including a second attachment feature adapted to attach the clamping member to the first attachment feature of the attachment base; and
a seal arrangement adapted to seal the plurality of cable elements to the enclosure at the entrance/exit location, the seal arrangement including a first side and an opposite, second side, wherein the first side is positioned at an interior of the enclosure and the second side is positioned at an exterior of the enclosure, and wherein the second side of the seal arrangement is laterally spaced closer than the first side of the seal arrangement from the at least one slot, the plurality of first gripping features, and the at least one clamping member.

2. The cable element attachment system of claim 1, wherein the attachment base is adapted to attach to the seal arrangement and the seal arrangement is attached to the entrance/exit location of the enclosure.

3. The cable element attachment system of claim 1, wherein at least one of the plurality of cable elements includes an optical fiber before attachment to the entrance/exit location of the enclosure.

4. The cable element attachment system of claim 1, wherein at least one of the plurality of cable elements includes no optical fiber before attachment to the entrance/exit location of the enclosure.

5. The cable element attachment system of claim 4, wherein the at least one of the plurality of cable elements that includes no optical fiber before attachment to the entrance/exit location of the enclosure is adapted to receive an optical fiber after attachment of the cable element to the entrance/exit location of the enclosure.

6. The cable element attachment system of claim 5, wherein the cable element is a sheath and wherein the optical fiber is blown in through the sheath that includes no optical fiber.

7. The cable element attachment system of claim 1, further comprising a second clamping member, wherein the clamping member is a first clamping member, wherein the at least one slot includes a first slot and a second slot positioned opposite a central member of the attachment base from the first slot, wherein the central member includes the plurality of first gripping features and a plurality of third gripping features positioned opposite the central member from the plurality of first gripping features, wherein the central member includes the first attachment feature and a third attachment feature positioned opposite the central member from the first attachment feature, wherein the second clamping member includes a plurality of fourth gripping features positioned opposite the third gripping features of the attachment base, each of the fourth gripping features adapted to grip a corresponding one of the plurality of cable elements, the second clamping member further including a fourth attachment feature adapted to attach the second clamping member to the third attachment feature of the attachment base.

8. The cable element attachment system of claim 1, wherein the slot is adapted to receive the plurality of cable elements through the open end and thereby not require the cable elements to be threaded through the entrance/exit location of the enclosure.

9. The cable element attachment system of claim 1, wherein the slot is adapted to receive the plurality of cable elements through the open end and thereby not require the cable elements to be threaded through the entrance/exit location of the enclosure, wherein the seal arrangement includes at least one sealing slot that extends to a slot end at an end of a seal of the seal arrangement, and wherein the sealing slot is also adapted to receive the plurality of cable elements through the slot end and thereby also not require the cable elements to be threaded through the entrance/exit location of the enclosure.

10. The cable element attachment system of claim 1, wherein the plurality of first gripping features and the plurality of second gripping features are adapted to deform a circular perimeter of the cable element to a non-circular perimeter and thereby grip the cable element.

11. The cable element attachment system of claim 10, wherein the non-circular perimeter is an elliptical perimeter.

12. The cable element attachment system of claim 10, wherein a circular circumference of the circular perimeter of the undeformed cable element is substantially equal to a non-circular circumference of the non-circular perimeter of the cable element.

13. The cable element attachment system of claim 1, wherein the plurality of first gripping features is staggered with respect to the plurality of second gripping features and thereby is adapted to induce the plurality of cable elements to undulate and thereby grip the cable element.

14. The cable element attachment system of claim 13, wherein the plurality of first gripping features is arranged in multiple first side rows with one of the first gripping features from each of the first side rows engaging the cable element and wherein the plurality of second gripping features is arranged in multiple second side rows with one of the second gripping features from each of the second side rows engaging the cable element.

15. The cable element attachment system of claim 14, wherein the multiple first side rows include two of the first side rows of the plurality of first gripping features, and wherein the multiple second side rows include three of the second side rows of the plurality of second gripping features.

16. The cable element attachment system of claim 1, wherein the attachment base includes at least one bend radius limiter adapted to limit a bend radius of the plurality of cable elements from becoming less than a minimum bend radius.

17. The cable element attachment system of claim 1, wherein the clamping member includes at least one bend radius limiter adapted to limit a bend radius of the plurality of cable elements from becoming less than a minimum bend radius.

18. A method for attaching a plurality of cable elements to an entrance/exit location of an enclosure, the method comprising:
   providing the enclosure including the entrance/exit location;
   providing an attachment base at the entrance/exit location;
   sliding the plurality of cable elements through an open end of a slot of the attachment base;
   clamping a clamping member on the plurality of cable elements by attaching the clamping member to the attachment base and thereby engaging a plurality of first gripping features of the attachment base and an opposite plurality of second gripping features of the clamping member to the plurality of cable elements, and
   further comprising deforming a circular perimeter of the plurality of cable elements to a non-circular perimeter and thereby gripping the cable elements.

19. The method of claim 18, further comprising sealing the plurality of cable elements to the entrance/exit location of the enclosure by sliding the plurality of cable elements through an end of a sealing slot of a seal positioned at the entrance/exit location.

20. The method of claim 18, further comprising deforming the plurality of cable elements along an undulating path through the plurality of first gripping features of the attachment base and the opposite plurality of second gripping features of the clamping member.

21. The method of claim 18, further comprising providing bend radius protection for the plurality of cable elements by the attaching the clamping member to the attachment base.

22. The method of claim 18, wherein the attachment base provides bend radius protection to the plurality of cable elements.

23. The method of claim 18, further comprising holding the cable elements with the attachment base before clamping the clamping elements.

24. A cable element attachment system for attaching a plurality of cable elements to an entrance/exit location of an enclosure, the cable element attachment system comprising:
   an attachment base adapted to attach to the entrance/exit location of the enclosure, the attachment base including:
      at least one slot that extends to an open end, the at least one slot including a first side and a second side;
      a plurality of first gripping features positioned adjacent the first side of the slot, each of the first gripping features adapted to grip a corresponding one of the plurality of cable elements; and
      a first attachment feature;
   a first clamping member including a plurality of second gripping features positioned opposite of the first gripping features of the attachment base, each of the second gripping features adapted to grip a corresponding one of the plurality of cable elements, the clamping member further including a second attachment feature adapted to attach the clamping member to the first attachment feature of the attachment base; and
   a second clamping member, wherein the at least one slot includes a first slot and a second slot positioned opposite a central member of the attachment base from the first slot, wherein the central member includes the plurality of first gripping features and a plurality of third gripping features positioned opposite the central member from the plurality of first gripping features, wherein the central member includes the first attachment feature and a third attachment feature positioned opposite the central member from the first attachment feature, wherein the second clamping member includes a plurality of fourth gripping features positioned opposite the third gripping features of the attachment base, each of the fourth gripping features adapted to grip a corresponding one of the plurality of cable elements, the second clamping member further including a fourth attachment feature adapted to attach the second clamping member to the third attachment feature of the attachment base.

\* \* \* \* \*